United States Patent [19]

Coates et al.

[11] Patent Number: 5,696,448
[45] Date of Patent: Dec. 9, 1997

[54] NMR SYSTEM AND METHOD FOR FORMATION EVALUATION USING DIFFUSION AND RELAXATION LOG MEASUREMENTS

[75] Inventors: George R. Coates, Austin; Duncan Mardon, Kingwood; Daniel L. Miller, Kingwood, all of Tex.

[73] Assignee: Numar Corporation, Malvern, Pa.

[21] Appl. No.: 494,507

[22] Filed: Jun. 26, 1995

[51] Int. Cl.$^6$ .................................................. G01V 3/32
[52] U.S. Cl. ................................................................ 324/303
[58] Field of Search .................................. 324/300, 303, 324/307, 309, 318, 322; 335/216

[56] References Cited

U.S. PATENT DOCUMENTS

| | | | |
|---|---|---|---|
| 3,508,438 | 4/1970 | Alger et al. | 73/152 |
| 4,291,271 | 9/1981 | Lauffer | 324/307 |
| 4,424,587 | 1/1984 | Lauffer | 324/303 |
| 4,710,713 | 12/1987 | Strikman | 324/303 |
| 4,717,878 | 1/1988 | Taicher et al. | 324/303 |
| 4,719,423 | 1/1988 | Vinegar et al. | 324/303 |
| 4,933,638 | 6/1990 | Kenyon et al. | 324/303 |
| 5,212,447 | 5/1993 | Paltiel | 324/303 |
| 5,363,041 | 11/1994 | Sezginer | 324/303 |
| 5,432,446 | 7/1995 | MacInnis et al. | 324/303 |
| 5,498,960 | 3/1996 | Vinegar et al. | 324/303 |

OTHER PUBLICATIONS

Morriss et al., "Hydrocarbon Saturation and Viscosity Estimation from NMR Logging in the Belridge Diatomite," 35th SPWLA Annual Logging Symposium (Jun. 19–22, 1994), pp. 1–24.

Carr et al., "Effects of Diffusion on Free Precision in Nuclear Magnetic Resonance Experiments," *Physical Review*, vol. 94, No. 3 (May 1, 1954), pp. 630–638.

Schlumberger Wireline & Testing, "Combinable Magnetic Resonance tool reliably indicates water–free production and reveals hard–to–find pay zones," (Jun. 1995).

Morris et al., "Field Test of an Experimental Pulsed Nuclear Magnetism Tool," SPWLA Annual Logging Symposium (Jun. 13–16, 1993), pp. 1–23.

Coates et al., "Core Data and the MRIL Show—A New Approach to 'Formation Factor,'" National SPWLA Convention (Jun. 15, 1992), pp. 1–15.

Kleinberg et al., "Novel NMR Apparatus for Investigating an External Sample," *Journal of Magnetic Resonance*, (1992) pp. 466–485.

Coates et al., "An Investigation of a New Magnetic Resonance Imaging Log," National SPWLA Convention (Jun. 18, 1991), pp. 1–24.

Howard et al., "Proton Magnetic Resonance and Pore–Size Variations in Reservoir Sandstones," *Society of Petroleum Engineers* (1990), pp. 733–741.

(List continued on next page.)

*Primary Examiner*—Sandra L. O'Shea
*Assistant Examiner*—Roger Phillips
*Attorney, Agent, or Firm*—Pennie & Edmonds LLP

[57] ABSTRACT

A simple, pore-level model for diffusion and NMR relaxation of oil-water mixtures in water wet pores has been developed. In addition to lending physical insight into the relaxation time behavior of mixed pore fluids, the model can be used to generate a practical tool for interpreting diffusion log data, i.e., a T2 vs. D cross plot. Locating points on the cross plot simultaneously yields the near wellbore water saturation and the rock pore size. For light oils, T2 is shown to be mainly a pore size indicator whereas D is controlled mainly by Sw. The pore size "resolution" decreases as oil viscosity and/or Sw decreases. A preliminary verification of the model has been made with limited core data and the results of applying the model to interpreting NMR log data are encouraging. The capability to separate the effects of pore size from fluid saturation on NMR response of pore fluids indicates an important potential advantage of the T2 and D measurement combination over standard T2 logging for characterizing formation pore size and related reservoir flow properties.

19 Claims, 23 Drawing Sheets

OTHER PUBLICATIONS

Miller et al., "Spin Echo Magnetic Resonance Logging: Porosity and Free Fluid Index Determination," *Society of Petrolum Engineers* (1990), pp. 321–334.

Kenyon et al., "Pore Size Distribution and NMR in Microporous Cherty Sandstones," SPWLA Thirtieth Annual Logging Symposium Jun. 11–14, 1989), pp. 1–24.

Clavier et al.,"The Theoretical and Experimental Bases for the 'Dual Water' Model for the Interpretation of Shaly Sands," *Journal of Petroleum Technology* (Apr. 1984), pp. 3–15.

Waxman et al., "Electrical Conductivities in Oil–Bearing Shaly Sands," *Society of Petroleum Engineers Journal* (1968) pp. 107–122.

NMR SYSTEM AND METHOD FOR FORMATION EVALUATION USING DIFFUSION AND RELAXATION LOG MEASUREMENTS

FIELD OF THE INVENTION

The present invention relates to systems for obtaining quantitative and qualitative measurements of a geologic structure using nuclear magnetic resonance (NMR) techniques. More specifically, this invention is directed to an efficient NMR well logging system and method for obtaining information related to a geologic structure on the basis of relaxation and diffusion properties of different fluids within the structure.

BACKGROUND OF THE INVENTION

Petrophysical parameters of a geologic formation which are typically used to determine whether the formation will produce viable amounts of hydrocarbons include formation porosity $\phi$, fluid saturation S, the volume of the formation, and its permeability K. Formation porosity is the pore volume per unit volume of formation; it is the fraction of the total volume of a sample that is occupied by pores or voids. The saturation S of a formation is the fraction of a its pore volume occupied by the fluid of interest. Thus, water saturation $S_W$ is the fraction of the pore volume which contains water. The water saturation of a formation can vary from 100% to a small value which cannot be displaced by oil, and is referred to as irreducible water saturation $S_{Wirr}$. For practical purposes it can be assumed that the oil or hydrocarbon saturation of the formation $S_O$ is equal to $S_O=1-S_W$. Obviously, if the formation's pore space is completely filled with water, that is if $S_W=1$, such a formation is of no interest for the purposes of an oil search. On the other hand, if the formation is at $S_{Wirr}$ it will produce all hydrocarbons and no water. Finally, the permeability K of a formation is a measure of the ease with which fluids can flow through the formation, i.e., its producibility.

NMR logging is among the most important methods which have been developed in the past to determine these and other geologic formation parameters of interest. The NMR logging method is based on the observation that when an assembly of magnetic moments, such as those of hydrogen nuclei, are exposed to a static magnetic field they tend to align along the direction of the magnetic field, resulting in bulk magnetization. The rate at which equilibrium is established in such bulk magnetization upon provision of a static magnetic field is characterized by the parameter T1, known as the spin-lattice relaxation time. Another related and frequently used NMR logging parameter is the so called spin-spin relaxation time constant T2 (also known as transverse relaxation time) which is related to the relaxation due to non-homogeneities in the local magnetic field over the sensing volume of the logging tool.

Another measurement parameter used in NMR well logging is the formation diffusion D. Generally, diffusion refers to the motion of atoms in a gaseous or liquid state due to their thermal energy. The diffusion parameter D is dependent on the pore sizes of the formation and offers much promise as a separate permeability indicator. In a uniform magnetic field, diffusion has little effect on the decay rate of the measured NMR echoes. In a gradient magnetic field, however, diffusion causes atoms to move from their original positions to new ones, which moves also cause these atoms to acquire different phase shifts compared to atoms that did not move, and will thus contribute to a faster rate of relaxation. Therefore, in a gradient magnetic field diffusion is a logging parameter which can provide independent information about the structure of the geologic formation of interest, the properties of the fluids in it, and their interaction.

It has been observed that the mechanisms which determine the values of T1, T2 and D depend on the molecular dynamics of the sample being tested. In bulk volume liquids, typically found in large pores of the formation, molecular dynamics is a function of molecular size and inter-molecular interactions which are different for each fluid. Thus, water and different types of oil each have different T1, T2 and D values. On the other hand, molecular dynamics in a heterogeneous media, such as a porous solid which contains liquid in its pores, differs significantly from the dynamics of the bulk liquid and generally depends on the mechanism of interaction between the liquid and the pores of the solid media. It may thus be appreciated that a correct interpretation of the measurement parameters T1, T2 and D can provide valuable information relating to the types of fluids involved, the structure of the formation and other well logging parameters of interest.

Prior art references show that the apparent relaxation rate observed in the late time echoes is reflecting the pore and fluid properties associated with pores most capable of production, commonly called the free fluid space. These references typically discuss measurements of the spin lattice relaxation T1 in rock samples that are fully water saturated or de-saturated using an air displacement process. However, the more practical case when a different proportion of oil is present in the pore space of the test sample is seldom considered at all in part because of the more complex log interpretation.

For many practical purposes it is believed that T1 and T2 at low field provide roughly the same petrophysical information. See for example, Kleinberg et al. *Nuclear Magnetic Resonance of Rocks: T1 vs. T2*, SPE 26470, presented at the 68th Annual Technical Conference and Exhibition, Society of Petroleum Engineers, Houston, Tex., 1993. In a well logging environment, measuring the transverse relaxation time T2 is, however, often preferable because it is more efficient. Standard methods for interpreting pulsed NMR log data are based on the relationship between the relaxation time T2 and rock pore size (volume-to-surface ratio) that is known to exist for water-saturated ($S_W=1$) rocks. However, when applied to partially oil-saturated rock, standard log interpretation methods can give misleading results for permeability and other formation properties which depend on the pore size. This is due to the fact that the relaxation time behavior of oil is determined mainly by the viscosity and other molecular properties of the oil and, at least in water-wet rock, is relatively insensitive to pore-surface relaxation effects. It is clear therefore that using the T2 parameter alone is insufficient to completely characterize and account for the effects of different fluids in a geologic formation of interest. Taken alone, diffusion measurements which carry information about the viscosity of the fluids are similarly incapable of resolving the effects of different fluids in a complex geologic formation.

In summary, even though a number of presently available NMR measurement parameters carry information about the structure of a geologic formation and the fluid composition of the formation, so far no consistent NMR well logging method has been proposed to accurately interpret these measurement parameters by accounting for the different effects of individual fluids. This lack may lead to inaccurate or misleading log data interpretation which in turn can cause costly errors in the oil exploration practice. Therefore, there is a need for a NMR system and method for providing consistent and accurate evaluation of geologic formations using a combination of different log measurements to take into account the effects of different fluids.

SUMMARY OF THE INVENTION

Accordingly, it is an object of the present invention to provide a system and method for interpreting borehole NMR measurements of pore fluid diffusion made with a gradient NMR logging tool.

It is another object of the present invention to provide a NMR system and method for the simultaneous determination of pore size and near-wellbore water saturation.

It is a further object of the present invention to provide a NMR system and method for estimating the hydrocarbon viscosity of a geologic formation on the basis of a set of predetermined parameters and of NMR logging measurements.

It is yet another object of the present invention to determine the hydrocarbon corrected T2 parameter used for intrinsic permeability determinations.

These and other objects are accomplished in accordance with one embodiment of the present invention by a novel system and method for the interpretation of NMR measurements of pore fluid diffusion D and T2 parameters made with a NMR logging tool using a gradient magnetic field. The system and method of the present invention are based on a simple model for diffusion and relaxation of water-oil mixtures in a water-wet rock. According to this model, the T2 and D measurement combination is used to separate pore size effects from the effects of oil viscosity and saturation on NMR log measurements. By modeling the T2 and D response for a particular oil viscosity and set of tool parameters, the gradient NMR log data alone can be used to obtain both pore size and near-wellbore fluid saturation estimates.

The method of the present invention described below is suitable for use in applications other than borehole environments and with materials other than those found in boreholes. The method has the advantage that the material being tested may be located outside the testing apparatus.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENT

Figure 1:
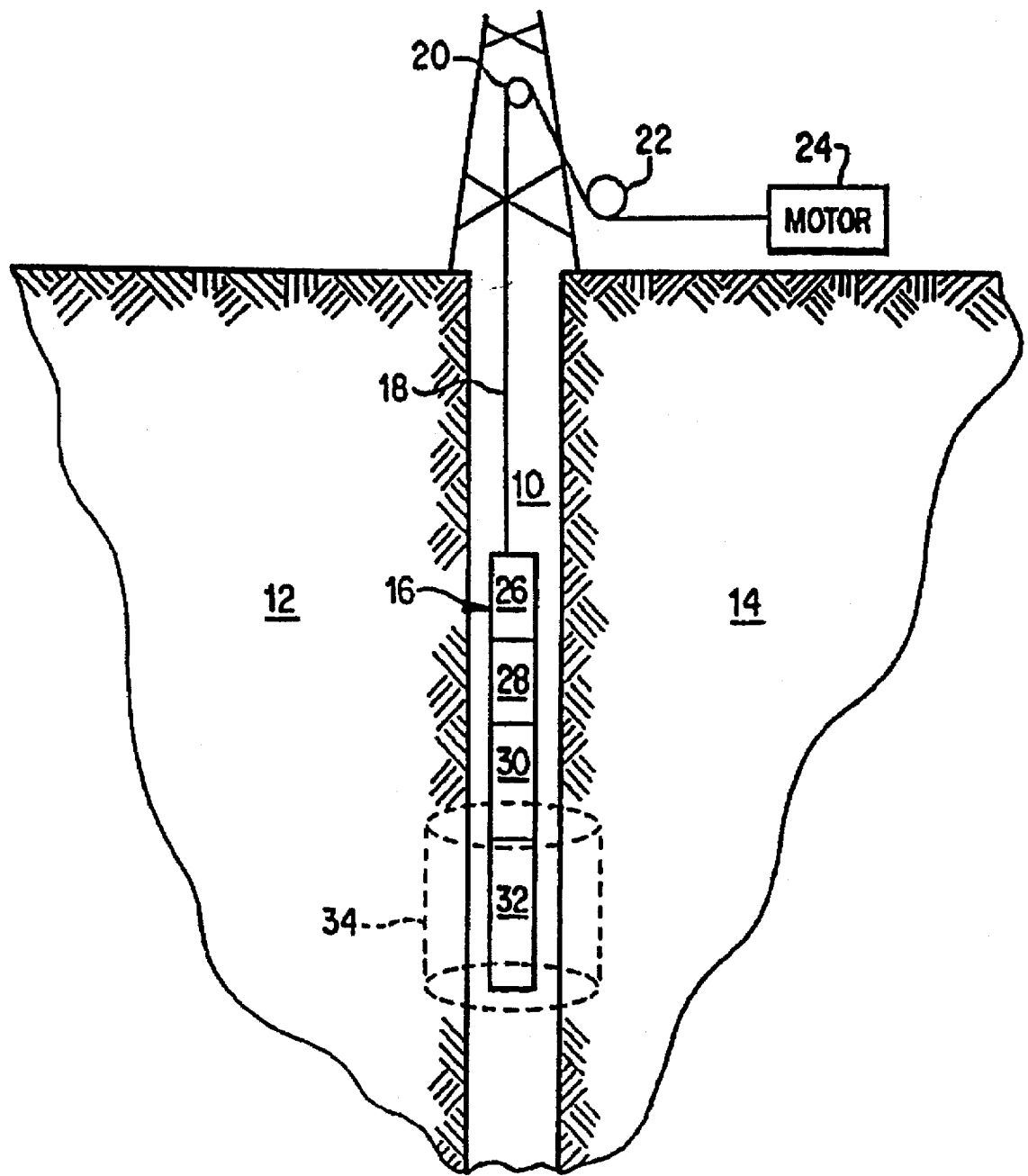
FIG. 1 is a partially pictorial, partially block diagram illustration of a well logging apparatus for obtaining nuclear magnetic resonance measurements of a geologic structure.

Referring to FIG. 1, a borehole 10 is shown in formation 12 having structures to be examined using the method and apparatus of the present invention. Within the borehole, there is a logging tool 16 which is suspended by a cable 18 routed over pulleys 20 and 22, with the position of the cable 18 being determined by a motor 24.

The upper portion of the logging tool 16 comprises telemetry electronics 26, gamma ray sensing electronics 28 and magnetic resonance imaging (MRI) electronics 30. A MRI probe 32 is suspended at the bottom of the probe to provide excitation to the surrounding geologic formation. The excitation field has a generally cylindrical shape as represented by reference numeral 34. Improved devices and measurement methods which can be used for the probe 32 are described generally, in U.S. Pat. Nos. 4,710,713; 4,717,876; 4,717,877; 4,717,878, 5,212,447; 5,280,243; 5,309,098 and 5,412,320 all of which are commonly owned by the assignee of the present invention. The contents of these patents are hereby expressly incorporated for all purposes.

Equipment

Figure 2:
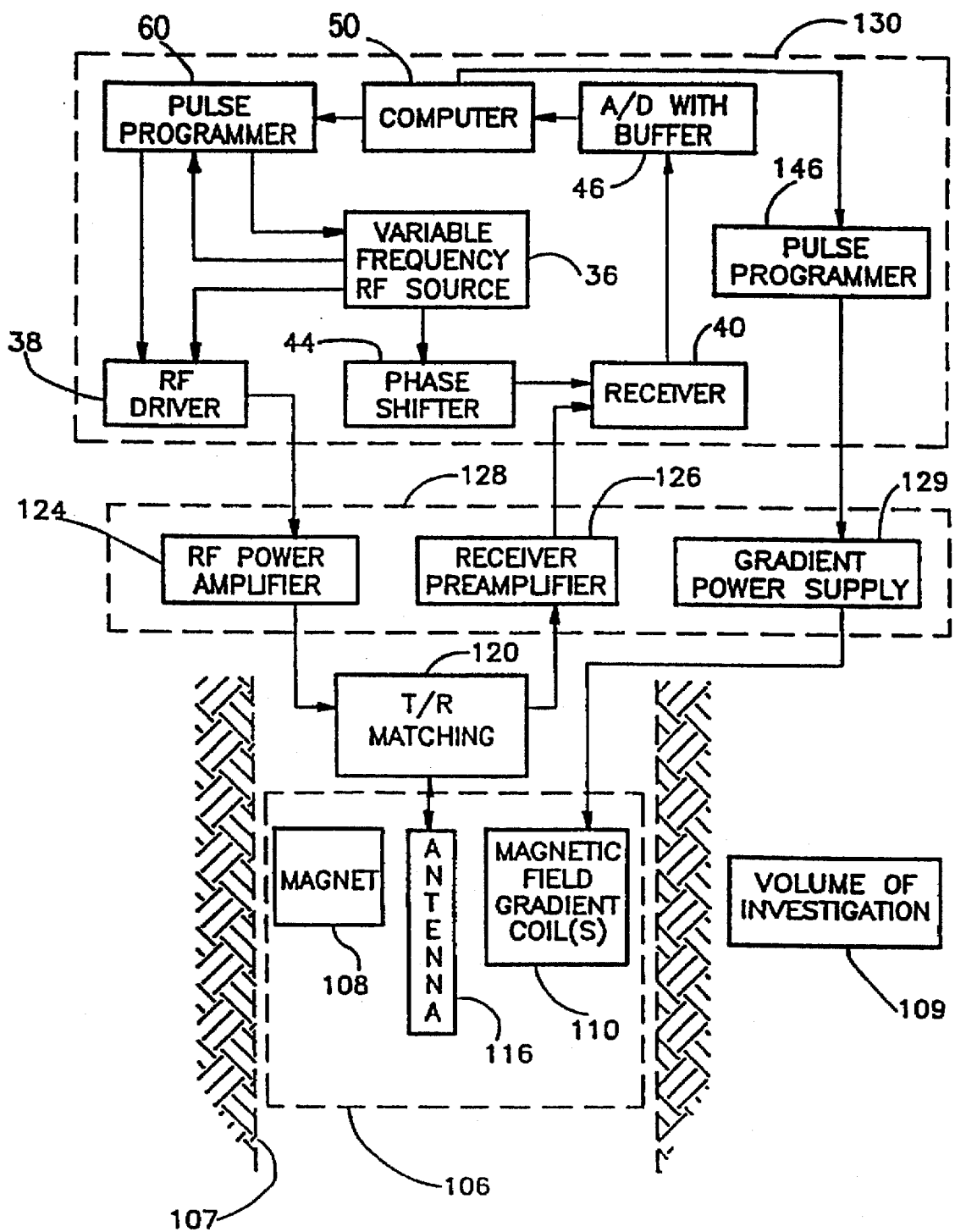
FIG. 2 is a block diagram illustration of apparatus for carrying out borehole diffusion measurements in accordance with one embodiment of the present invention.

Reference is now made to FIG. 2, which illustrates, in relatively general form, apparatus for carrying out NMR borehole diffusion coefficient determinations in accordance with a preferred embodiment of the present invention. The apparatus includes a first portion 106, which is arranged to be lowered into a borehole 107 in order to examine the nature of materials in the vicinity of the borehole.

The first portion 106 comprises a magnet or a plurality of magnets 108 which generate a preferably substantially uniform static magnetic field in a volume of investigation 109. The first portion 106 also comprises an RF antenna coil 116 which produces an RF magnetic field at the volume of investigation 109 which field is substantially perpendicular to the static magnetic field.

A magnetic field gradient coil, or plurality of coils, 110 generates a magnetic field gradient at the volume of investigation 109. This additional contribution to the magnetic field has a field direction preferably collinear with the substantially uniform field and has a substantially uniform magnetic field gradient, which may or may not be switched on and off by switching the dc current flowing through the coil or coils 110. The magnet or magnets 108, antenna 116 and the gradient coil 110 constituting portion 106 are also referred to as a probe.

The antenna together with a transmitter/receiver (T/R) matching circuit 120 typically include a resonance capacitor, a T/R switch and both to-transmitter and to-receiver matching circuitry and are coupled to an RF power amplifier 124 and a receiver preamplifier 126. A power supply 129 provides the dc current required for the magnetic field gradient generating coils 110. All the elements described above are normally contained in a housing 128 which is passed through the borehole. Alternatively, some of the above elements may be located above ground.

Indicated in a block 130 is control circuitry for the logging apparatus including a computer 50, which provides a control output to a pulse programmer 60 which receives an RF input from a variable frequency RF source 36. Pulse programmer 60 controls the operation of the variable frequency RF source 36 as well as an RF driver 38, which receives an input from variable frequency RF source 36 and outputs to RF power amplifier 124.

The output of RF receiver preamplifier 126 is supplied to an RF receiver 40 which receives an input from a phase shifter 44. Phase shifter 44 receives an input from variable frequency RF source 36. Receiver 40 outputs via an A/D converter with a buffer 46 to computer 50 for providing desired well logging output data for further use and analysis. Pulse programmer 146 controls the gradient coil power supply 129 enabling and disabling the flow of current, and hence the generation of static or pulsed field gradients, according to the commands of the computer 50. Some or all of the elements described hereinabove as being disposed in an above-ground housing, may instead be disposed below ground.

Figure 3:
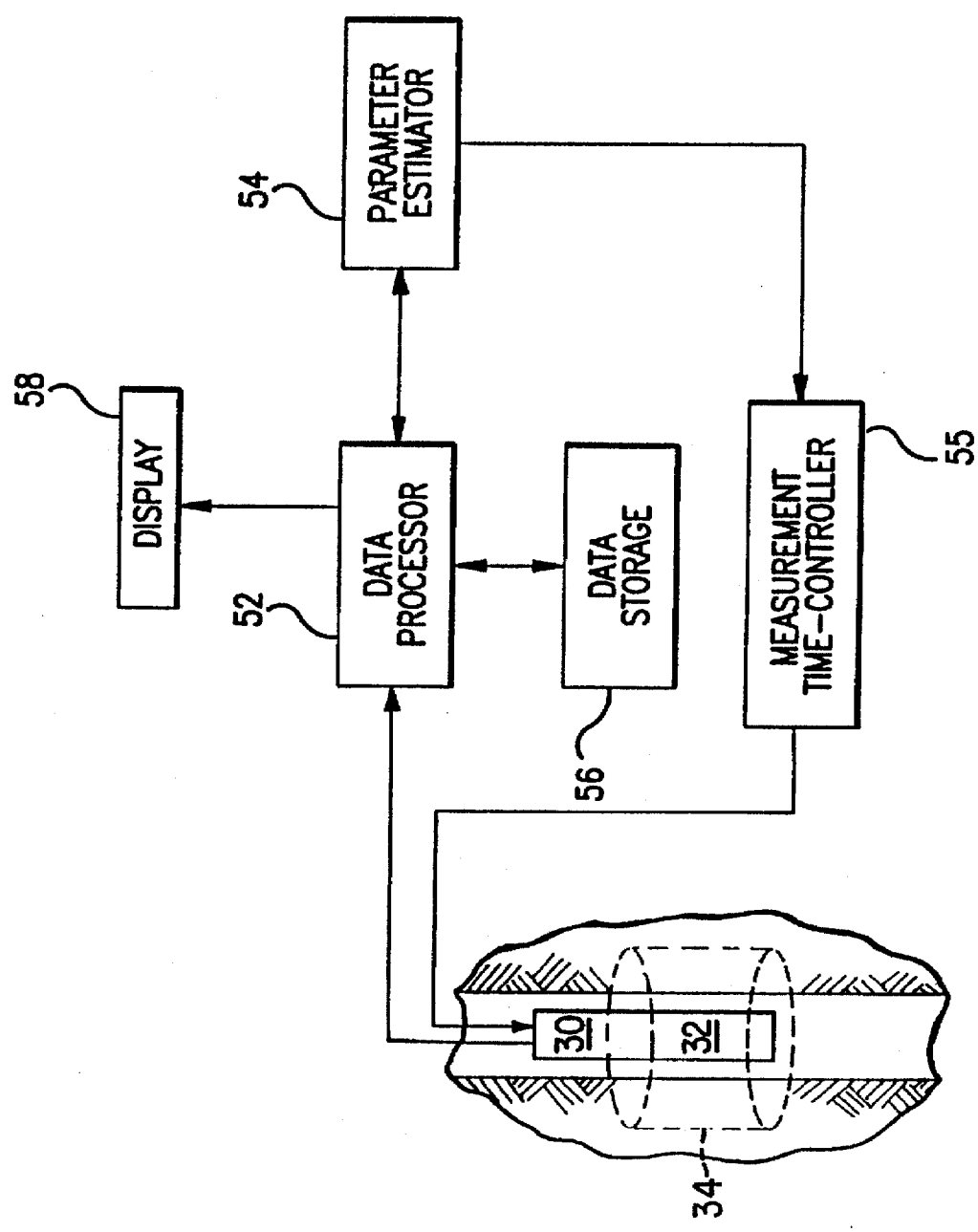
FIG. 3 is a block diagram of the system in accordance with a specific embodiment of the present invention which shows individual block components for controlling data collection, processing the collected data and displaying the measurement results.

FIG. 3 is a block diagram of the system in accordance with a specific embodiment of the present invention which shows individual block components for controlling data collection, processing the collected data and displaying the measurement results. In FIG. 3 the MRI electronics 30 comprises an MRI probe controller and pulse echo detection electronics. The output signal from the detection electronics is processed by data processor 52 to analyze the relaxation characteristics of the sample. The output of the data processor 52 is provided to the parameter estimator 54. Measurement cycle controller 55 provides an appropriate control signal to the MRI probe. The processed data from the log measurement is stored in data storage 56. Data processor 52 is connected to display 58 which is capable of providing a graphical display of one or more measurement parameters, possibly superimposed on display data from data storage 56.

The components of the system of the present invention shown in FIG. 3 can be implemented in hardware or software, or any combination thereof suitable for practical purposes.

The calibration of the tool can be accomplished through multi-dimensional regression analysis utilizing optimally selected and prepared laboratory samples. Such regression techniques are known to those skilled in the art and are described, for example, in the following references: K. Fukunaga, *Introduction to Statistical Pattern Recognition*, Academic Press, 1972; Bhattacharyya & Johnson, *Statistical Concepts and Methods*, Wiley & Sons, 1977; and Devijver & Kittler, *Pattern Recognition—A Statistical Approach*, Prentice Hall, 1982. In a preferred embodiment of the invention the tool is calibrated in a water tank, i.e., at a 100% porosity condition. The sample is tap water doped with cupric sulfate. The doping shortens the water T1 relaxation time from about 3 seconds to about 200 msec which in turn decreases the recovery time required between each experiment and hence decreases the total time needed to calibrate the tool.

Figure 4:
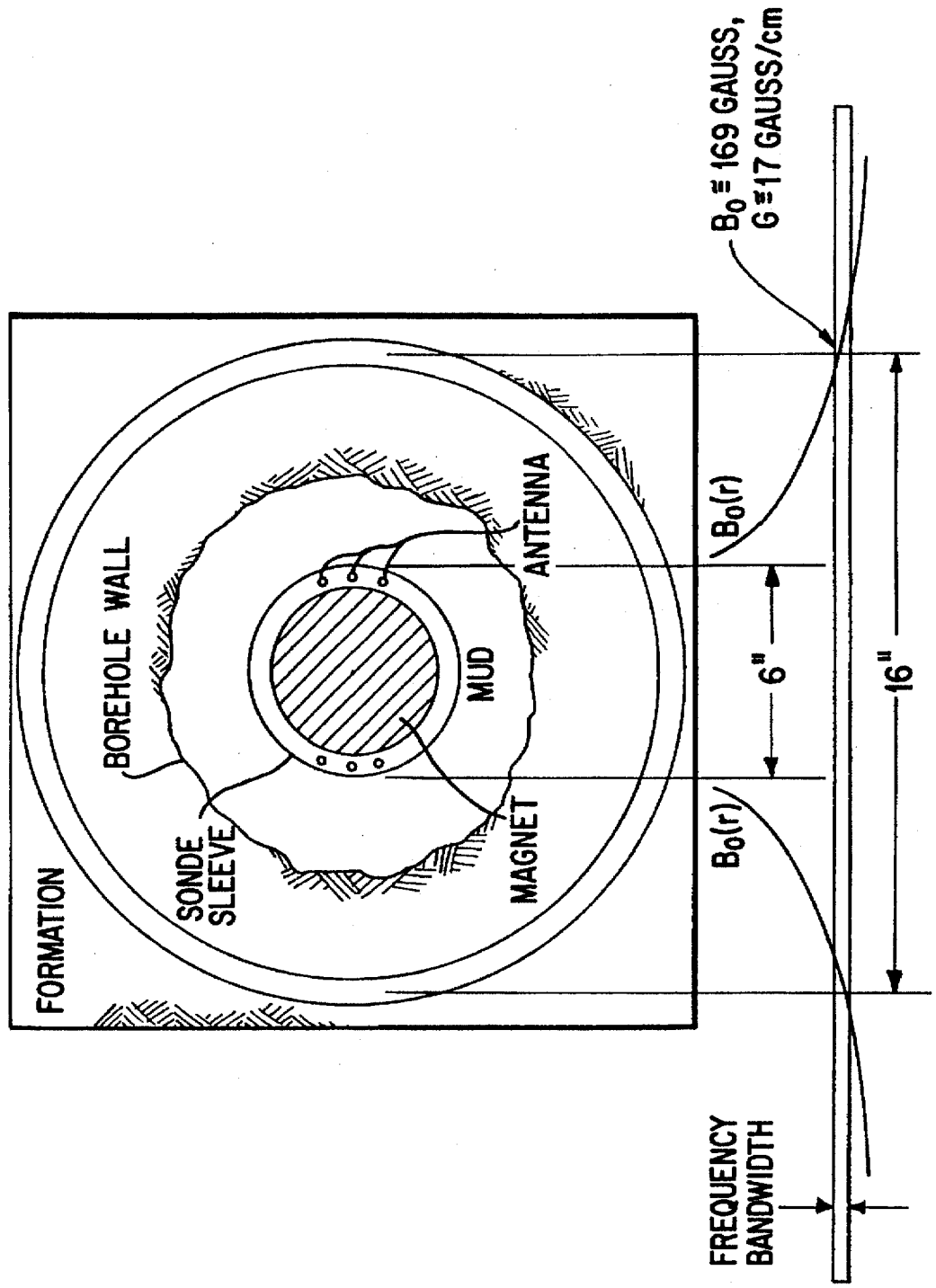
FIG. 4 illustrates investigation characteristics of the MRIL® tool used in a preferred embodiment of the present invention.

FIG. 4 illustrates investigation characteristics of the MRIL® tool used in a preferred embodiment of the present invention. The static field strength $B_0$ and gradient G at the resonance diameter for hydrogen shown are for a standard 6-inch (15.24 cm) diameter sonde operating at 720 kHz, 25° C. The actual parameters $B_0$, G and resonance diameter (the depth of investigation) depend on operating frequency and temperature. As shown in FIG. 4, the tool provides a quasi-linear gradient of about 17 Gauss/cm at a nominal diameter of investigation of 16 inches (40.6 cm). Spin diffusion in the gradient magnetic field of the tool contributes to faster relaxation which is more pronounced at the longer inter-echo spacings $TE_1$. Preferably, TE pairs used in diffusion logging combine the minimum TE for the tool (in a specific embodiment about 1.2 msec) with any one from a set of values standard for the tool (in a specific embodiment 2.4, 3.6, 6 msec echo spacings). Alternative inter-echo spacing pairs may be used if necessary.

Fixed Gradient NMR Measurements

Figure 5A:
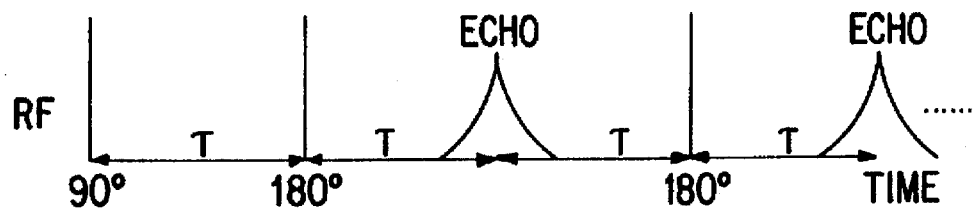
FIGS. 5 A and B illustrate RF pulses and echoes and a fixed magnetic field gradient which are employed in accordance with one embodiment of the present invention.
Figure 5B:
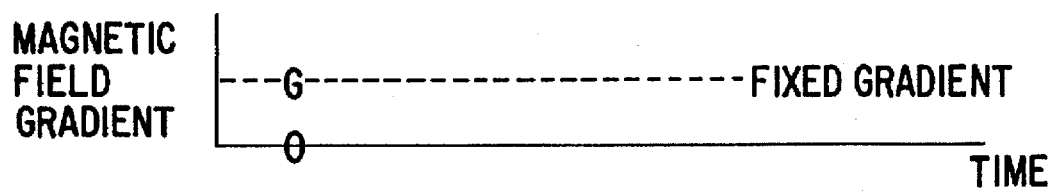

In accordance with the present invention parameters of interest such as T2 and D can be obtained using either fixed gradient or pulsed gradient diffusion measurements. Reference is now made to FIGS. 5A and 5B which illustrate RF pulses and echoes and a fixed magnetic field gradient respectively which are employed in accordance with one embodiment of the present invention. Briefly, this log measurement technique which is described in more detail below involves measuring Carr-Purcell-Meiboom-Gill (CPMG) spin echoes where one or more measurement parameter is changed. In a preferred embodiment, the parameter which is changed between successive measurements is the inter-echo spacing TE.

In general, to obtain estimates of the desired measurement parameters, or bounds on their values, using the system of the present invention the following operational steps take place:

1. A static magnetic field is applied to polarize the nuclear spins in the material at a given region of the borehole, thus creating bulk magnetization at the region of interest. The field and the collinear magnetization thus produced define a vertical direction.

2. A magnetic field gradient is applied at the region of interest. This gradient field might or might not be part of the static magnetic field of the first step.

3. An RF field is applied to the region of interest at a preselected frequency, duration and magnitude in order to cause at least part of the magnetization to lie in a horizontal plane, defined relative to the vertical axis.

4. A time interval t through which atoms and molecules of the material in the region of interest may diffuse within a fixed magnetic gradient field.

5. A refocusing RF pulse is applied to the region of interest.

6. Step 4 is repeated.

7. The NMR spin echo is acquired.

8. The diffusion coefficient D or an upper bound thereof, or the spin echo decay T2 or a lower bound thereof is derived from the echo amplitude.

9. Steps 1 through 7 are repeated at least once, with different t or magnetic field gradient strength.

10. D and/or T2 are derived from echo amplitudes of some or all of the experiments.

It is appreciated that steps 4 through 7 may be repeated multiple times successively in order to obtain a sufficiently long echo amplitude train, from which the transverse relaxation time may more meaningfully be derived.

It is further appreciated that steps 9 and 10 are not required if either D or T2 is known. In that case, the unknown T2 or D parameter can be derived from a single experiment. Likewise, no more than one experiment is required when either D or T2 is known to substantially dominate the decay of the echo amplitude.

The advantage of repeating the experiment and integrating the measurement readings in order to obtain statistically valid and meaningful results is also appreciated.

It is also recognized that step 5 might alternatively be replaced by application of two or more pulses whose combined effect is the refocusing of the nuclear spins yielding a stimulated echo at step 7 and allowing more time for diffusion in between these pulses.

In a preferred embodiment of the present invention the parameter which is changed in the fixed-gradient diffusion measurement is inter-echo spacing TE. The spin-echo data measured at each TE are first processed separately to obtain a pair of relaxation time distributions, one for each TE. Each distribution is then reduced to a single, characteristic relaxation time value $T2_R$ by averaging of either 1) the entire distribution or 2) the slow-relaxing components corresponding to the free-fluid volume (FFI). The restricted diffusion coefficient D is then computed from the relaxation rate difference $$\Delta T2_R^{-1} = T2_R^{-1}(TE_l) - T2_R^{-1}(TE_S) \quad (1)$$

$$= \frac{D}{12} (\gamma G)^2 (TE_l^2 - TE_S^2)$$

where $TE_l$ and $TE_S$ are the long and short TE values of the TE measurement pair. Equation 1 is just the difference between two Carr-Purcell equations for the diffusion-induced relaxation rate $T2D^{-1}$ at each TE, $$T2_D^{-1} = \frac{D}{12} (\gamma \cdot G \cdot TE)^2 \quad (2)$$

where $\gamma$ is the gyromagnetic ratio ($=2\pi \times 4258$ rad/sec/Gauss for protons). Intrinsic T2, which is independent of TE, is then computed by substituting Equation 2, in which parameter D is evaluated from Equation 1 at either spacing TE, into the expression for the total relaxation rate $T2_R^{-1}$, i.e., $$T2_R^{-1} = T2^{-1} + T2_D^{-1} \quad (3)$$

Equations 1–3 can thus be used to obtain estimates of the T2 and D parameters from the relaxation rates $T2_R^{-1}$ evaluated from the decay signals at two different inter-echo spacings.

Pulsed Field Gradient NMR Diffusion Measurements

Figure 6A:
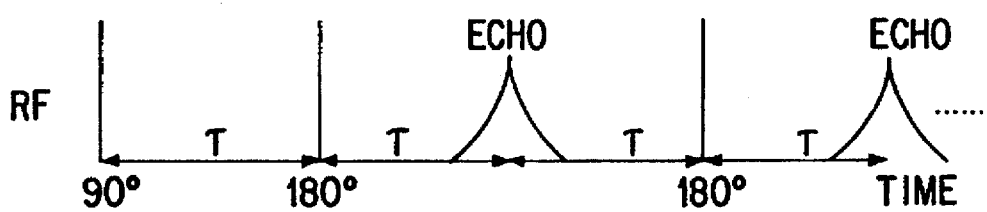
FIGS. 6 A and B illustrate RF pulses and echoes and magnetic field gradient sequences respectively, which are employed in accordance with another embodiment of the present invention.
Figure 6B:
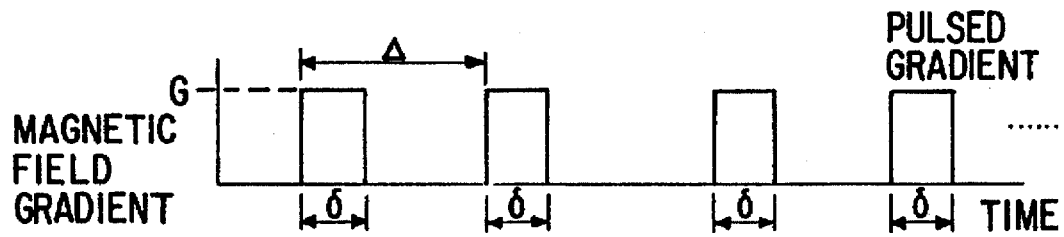

Reference is now made to FIGS. 6A and 6B which illustrate RF pulses and echoes and Magnetic Field Gradient Sequences respectively, which are employed in accordance with another embodiment of the present invention. To obtain estimates of the desired measurement parameters, or bounds on their respective values, using the system of the present invention the following operational steps take place:

1. A static magnetic field is applied to polarize the nuclear spins in the material at a given region of the borehole, creating bulk magnetization at the region of interest. The field and the collinear magnetization thus produced define a vertical direction.

2. An RF field is applied to the region of interest at a preselected frequency, duration and magnitude in order to cause at least part of the magnetization to lie in a horizontal plane, defined relative to the vertical axis.

3. A time switched magnetic field gradient pulse is applied through which the atoms and molecules of the material in the region of interest may diffuse. Typical pulse amplitude, duration and frequency are 0.1–30 G/cm for 0.1–10 ms.

4. A refocusing RF pulse is applied to the region of interest.

5. Repeat step 3.

6. The NMR spin echo is acquired.

7. Derive the diffusion coefficient D, or an upper bound thereof, or the spin echo decay T2 or a lower bound thereof, from the echo amplitudes.

8. Repeat steps 1 through 6 with a different value for at least one of the following variables: magnetic field gradient strength of steps 3 and 5; magnetic field gradient duration of steps 3 and 5; timing of steps 3, 4, 5 and 7.

9. Derive the diffusion coefficient and/or T2 from the acquired NMR data.

It is appreciated that steps 3 through 6 may be repeated multiple times successively in order to obtain a sufficiently long echo amplitude train, from which the transverse relaxation time may more meaningfully be derived.

It is further appreciated that step 7 is not required if both D and T2 are unknown and neither could be considered as dominating the decay rate. Steps 8 and 9 are not required if either D or T2 is known. In that case, the unknown T2 or D can be derived from a single experiment. Likewise, no more than one experiment is required when either D or T2 is known to substantially dominate the decay of the echo amplitude.

It is further appreciated that time dependency of the magnetic field gradient other than the square pulse of FIG. 3B may be used. Specifically, when the pulsed gradient is switched off, the gradient strength should not necessarily diminish and sinusoidal and other dependencies might be employed.

The advantage of repeating the experiment and integrating the measurement readings in order to obtain statistically valid and meaningful results is also appreciated.

It is also recognized that step 4 might alternatively be replaced by application of two or more pulses whose combined effect is the refocusing of the nuclear spins yielding a stimulated echo at step 6 and allowing more time for diffusion in between these pulses.

Analysis of NMR Diffusion Data

The derivation of the diffusion coefficient D may be carried out using the following equations for the constant gradient case:

$$a_n = A e^{-nTE(1/T2 + D(\gamma TE)^2/12)}$$

or for the pulsed gradient:

$$a_n A\, e^{-n(TE/T2 + D\,(\gamma \delta)^2 (delta - \delta/2))}$$

where:

A is the magnitude of the signal at te→0 or zero time. A might or might not be known;

n is the echo number;

$a_n$ is its measured amplitude;

TE is the inter echo spacing applied by the experimenter;

T2 is the intrinsic transverse relaxation time of the liquid at the in situ physical and chemical conditions; T2 might or might not be known prior to the measurement;

D is the diffusion coefficient of the fluid at the in situ conditions. D might or might not be known prior to the measurement;

$\gamma$ is the gyromagnetic ratio of the isotope studied ($2\pi \times 4.26$ KHz/Gauss for hydrogen);

G is the magnitude of the magnetic field gradient imposed at the volume of investigation by the experimental setup. G is known;

$\delta$ is the duration of the magnetic field gradient pulse; and delta is the time between the two magnetic field gradient pulses which precede each echo.

Dependent on the specific parameter of interest and the available information four different cases can be considered:

I. Two out of the three parameters of the liquid in the volume of investigation—A, T2 and D—are known. The third might then be derived from the above equations. For example, if A and T2 are known and the first echo amplitude, $a_1$ is measured, then for a constant gradient $$D = [-TE/T2 - \ln(a_1/A)] * 12/(\gamma)^2 TE^3$$

More echoes, as well as repeated measurements, may improve the statistical validity of this result.

II. The amplitude A is known, neither T2 nor D are known but only an upper bound for D and/or lower bound for T2 is sought for. An upper bound for D is obtained from the above mentioned equations by replacing the TE/T2 term by zero. A lower bound for T2 is obtained by setting D=0. Such bounds may be very useful in various cases, e.g. in discriminating hydrocarbon from water on the basis of either D or T2, or in discriminating light from heavy oil.

III. A is either known or unknown but of no interest. Several echoes are recorded and the apparent decay rate is calculated. As an example, for the constant gradient case, the apparent transverse relaxation time is:

$$T2_R = [1/T2 + D(\gamma GTE)^2/12]^{-1}$$

It is derived from a best fit procedure of the measure of echo amplitudes, $a_n$, to their representation $$a_n = A e^{-nC}$$

where $C = TE/T2_R$ in which $T2_R$ is a fitting parameter.

Alternatively, by dividing all of the amplitudes by one of the echo amplitudes, for example, $a_1$, the obtained ratios are to be represented by the right hand of $$a_n/a_1 = \exp[-(nTE - TE)/T2_R]$$

A is factored out and D, T2 or either of their bounds can be derived from the above mentioned equation relating $T2_R$, T2 and D. Once again, the upper D bound is obtained by setting 1/T2 to zero and solving for D, and the lower T2 bound is obtained by setting D to zero.

Alternatively, T2 or D or either of their bounds can be derived from repetition of the same experiment at least twice, varying one or more of the following parameters: TE, G, delta or $\delta$.

IV. If both D and T2 are unknown and the above mentioned bounds are insufficient approximations, the apparent relaxation time should be calculated at least twice for two experiments differing in at least one of the following parameters: TE, G, delta or $\delta$. In cases such as that of a preferred embodiment of this invention, for which the gradient G is also a function of the field strength and hence a function of the resonance frequency, two or more experiments differing in the resonance frequency are sufficient.

It is convenient, though not necessary, to rewrite the relation between $T2_R$, T2 and D in terms of the following relaxation rate parameters:

$$R2_R = 1/T2_R$$

and $$R2 = 1/T2.$$

The equation for R2 and D is linear, i.e.:

$$R2_R = R2 + D(\delta GTE^2)/12$$

for the fixed gradient embodiment. The two or more distinct experiments yield a set of two or more linear equations for T2 and D having different values of $R2_R$. Out of this set of two or more equations, T2 and D may be derived by either explicit solution of the two linear equations yielding the values of the two unknowns, or best fit (such as least squares) for a set of three or more distinct experiments.

It is appreciated that several experiments of the type described above may be combined into a single experiment by acquiring all the required data from the signals of a single excitation. This can be accomplished by changing the above mentioned parameters during a single sequence. As an illustrative example: the first few echoes are spaced by one fixed time interval, the next few by another, and so on.

Figure 7:
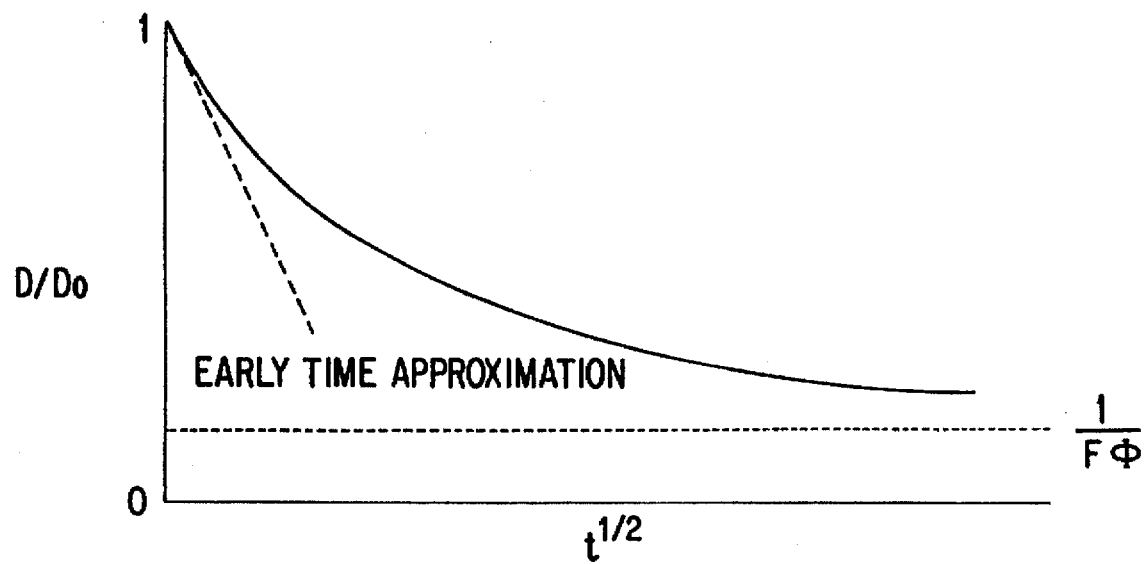
FIG. 7 shows the restricted diffusion coefficient D, normalized to bulk fluid diffusivity Do, as a function of the square root of the time and an early-time approximation to the function.

The restricted diffusion coefficient D for a fluid in a porous medium is known to be a decreasing function of the diffusion time t. FIG. 7 shows the restricted diffusion coefficient D, normalized to bulk fluid diffusivity Do, as a function of the square root of the time. For short diffusion times, the value of D obtained from a pulsed-field gradient (PFG) NMR experiment has been shown to be given by $$\frac{D}{D_o} = \frac{4\sqrt{D_o t}}{9\sqrt{\pi}} \left(\frac{A}{V}\right),$$

where Do is the diffusivity of the bulk fluid and A/V is the pore surface-to-volume ratio. The relationship between the early-time approximation in Equation 4 and the full non-linear behavior of D as a function of the time t is shown schematically in FIG. 7.

A minor complication arises when trying to compare PFG to fixed-gradient NMR estimates of the diffusion parameter D. The problem is that since the measurement in the latter case makes use of two evolution times (i.e., two TE's), a single value of t is not defined as a basic measurement parameter. In contrast, diffusion time is an explicit parameter in the PFG NMR test; t is simply the time between the gradient pulses. To compare the two measurements, a single effective diffusion time $t_{eff}$ for the fixed-gradient experiment has to be defined. From a heuristic analysis of Equation 3 we find:

$$t_{eff} \cong \sqrt{TE_l^2 - TE_s^2} \quad . \tag{5}$$

Note that the $t_{eff}$ is weighted toward the longer TE; e.g., for the echo spacing pair 1.2, 3.6 msec, $t_{eff}=3.4$ msec.

Equation 5 is an approximation which ignores the effect of restricted diffusion and off-resonance effects that arise from the strong gradient and wide bandwidth of the measurement. Correction for these effects has been determined to be relatively small, so that Equation 5 is sufficiently accurate for practical analysis of diffusion log data.

NMR Relaxation and Diffusion Modeling

The presence of oil as a second pore fluid complicates the application of the standard NMR interpretation schemes that (explicitly or implicitly) assume relaxation time is linearly proportional to pore size (volume-to-surface ratio). Combining diffusion and relaxation measurements in accordance with a preferred embodiment of the present invention enables one to separate pore size effects from the effects of varying oil viscosity on the bulk relaxation time behavior. More specifically, this combination provides the capability of estimating both near-wellbore fluid saturations and formation pore size, using a single measurement as shown in more detail next.

Figure 8A:
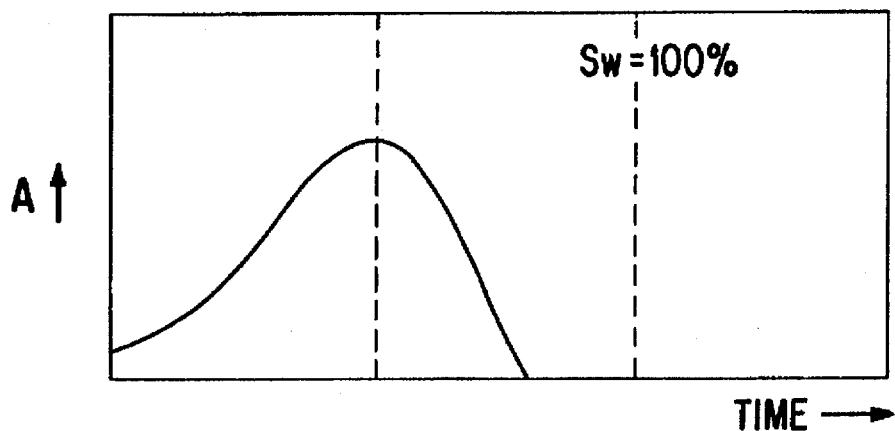
FIGS. 8 A–C illustrate the T2 distribution change, as the free fluid pore space shifts from 100% water bearing to irreducible water saturation.
Figure 8B:
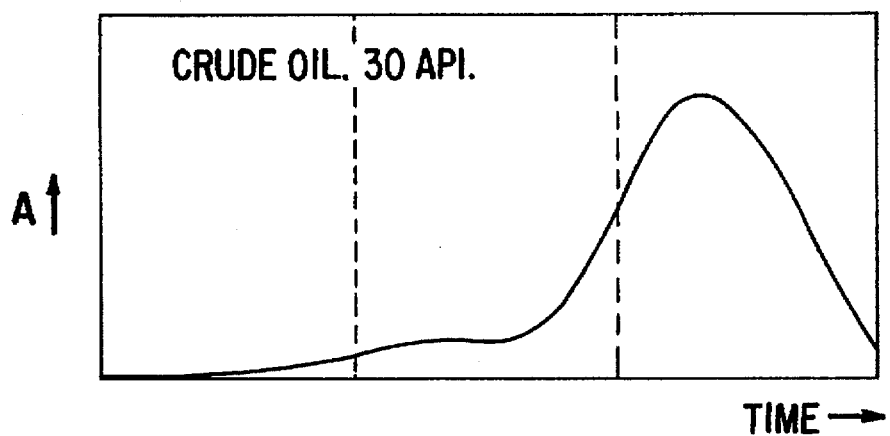
Figure 8C:
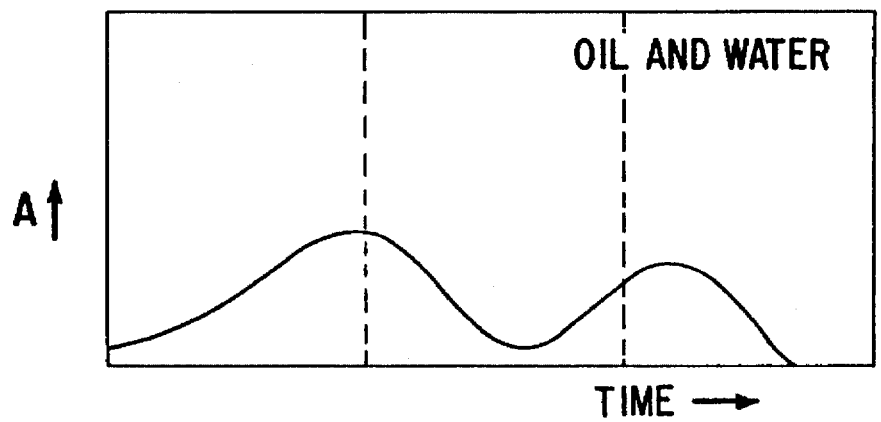

Conceptually it is useful to reflect first on how the relaxation of a complex fluid comprising two different components, such as oil and water is influenced by the transition from a formation full of water ($S_w$=1) to oil bearing at irreducible water. This transition is illustrated in FIGS. 8A–C where the T2 distribution is seen to change as the free fluid pore space shifts from 100% water bearing (FIG. 8A) to irreducible water saturation (FIG. 8C). The T2 distribution of an oil group which is determined by the relaxation property of the bulk oil is shown in FIG. 8B.

As clear from FIGS. 8A–C, the measured or apparent relaxation $T2_R$ of a formation reflects the fluid components in a unique manner. When the pores in the rock are water wetted and the rock is water saturated the $T2_R$ relaxation represents the pore size quite directly; in the case when there is oil in the same water wetted pores the log interpretation is more complex because the $T2_R$ measurements also reflect the bulk oils relaxation properties.

Significant insight, leading to a novel log interpretation tool is obtained in accordance with the present invention from a simple pore-level model, outlined below, for the NMR response of oil and water mixtures in a single, water-wet pore.

Figure 9:
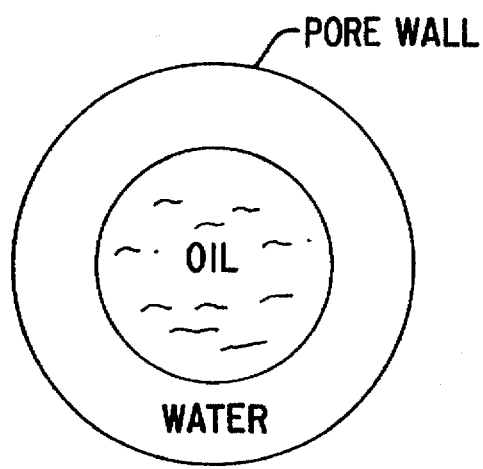
FIG. 9 illustrates the water-oil mixture model in accordance with the present invention. Based on the assumption of a water-wet pore surface, the water is assumed to form a "jacket" around a blob of oil at the center of a spherical pore.

FIG. 9 illustrates the proposed model which is a single, spherical pore containing both oil and water. Based on the assumption of a water-wet pore surface, the water is assumed to form a "jacket" around a blob of oil at the center of the pore. In this model, the effect of changing water saturation $S_w$ is represented as an increase or decrease of the size of the oil blob. The water-oil mixture in the spherical pore has a relaxation rate generally governed by the expression in Equation 3 above. Importantly, the measured relaxation rate $T2_{Ri}^{-1}$ for each fluid i=W(ater) or O(il) will itself be the sum of an intrinsic (time-independent) relaxation rate and a diffusion-induced (time-dependent) relaxation rate, i.e., $$T2_{Ri}^{-1} = T2_i^{-1} + T2_{Di}^{-1}. \tag{6}$$

Equation 6 indicates that the water-oil mixture will thus have two different relaxation rates, i.e. will exhibit bi-exponential decay properties. If one can obtain estimates of the individual relaxation rates of both the oil and water components, using Equation 6 it would then be possible to model the behavior of the mixture, as shown in more detail next.

Turning next to the individual right hand side entries of Equation 6, we first assume that the intrinsic relaxation rate of the oil is the same as that for bulk oil, i.e., $$T2_o^{-1} = T2_{bulk\ oil}^{-1}. \tag{7}$$

Equation 7 is a mathematical expression of the assumption that cross-relaxation effects between oil and water on the oil relaxation rate are negligible. The intrinsic relaxation rate of the water on the other hand is given by $$T2_W^{-1} = T2_{bulk\ water}^{-1} + \rho_2 \left( \frac{A}{VS_W} \right) \tag{8}$$

where A and V are respectively the pore surface area and volume, and $\rho_2$ is the surface relaxivity. For spherical pores, A/V=3/R where R is the pore radius. Setting $S_W$=1 in Equation 8 gives the well-known relationship between T2 and pore size for a water-filled pore. For the case when $S_W$<1 Equation 8 is used on the basis of an extension of the fast-diffusion model to the situation in which part of the pore volume is taken up by oil. (In a fast-diffusion regime, there is rapid exchange, via molecular diffusion, between fast-relaxing spins on pore surfaces and the bulk fluid. Rapid exchange homogenizes the magnetization throughout the pore resulting in the observation of a single relaxation rate that is the volume-weighted average of the bulk-fluid and surface relaxation rates). From the assumption of a water-wet condition, the water-pore interfacial area does not change as $S_W$ varies. Accordingly, Equation 8 shows that the relevant length-scale for relaxation of water in a partially oil-filled pore is the parameter $u=S_W(V/A)$.

The diffusion-induced contribution to the observed relaxation rate for each fluid is represented by the Carr-Purcell equation $$T2_{Di}^{-1} = \frac{D_i}{3} (\gamma G \tau)^2 \tag{9}$$

where $D_i$ is the effective diffusion coefficient for fluid i, $\gamma$ is the gyromagnetic ratio, G is the magnetic field gradient, and $\tau$ is the pulse-echo time delay (i.e., half the inter-echo spacing TE in a CPMG pulse sequence). In general, $D_i < D_{oi}$, i.e. the restricted diffusivity is smaller than the diffusivity of the bulk fluid due to the restriction of diffusion by the (solid) porous medium and by the other (immiscible) fluid that partially fills the pore space.

Restricted diffusion in both the oil and water are modeled by simple extension of the short-diffusion time approximation for the restricted diffusion coefficient introduced by Mitra et al. (Mitra, P. P. et al. *Diffusion Propagator As A Probe Of The Structure Of Porous Media*, Phys. Rev. Lett., 68, 3555–3558, 1992). In water, the D/Do ratio is given by $$\left(\frac{D}{D_o}\right)_W = 1 - \beta_W \left(\frac{1+S_O^{2/3}}{S_W}\right)\frac{A}{V} \quad (10A)$$

where $$\beta_W = \frac{4}{9\sqrt{\pi}} \sqrt{D_{oW}(2\tau)} \quad (10B)$$

and $S_O=1-S_W$ is the oil saturation. For the case $S_W=1$, Equation 10A reduces to the result of Mitra (1992). The parameter $\beta_W$ has units of length and represents a characteristic diffusion length for water molecules that occurs during the inter-echo time TE=2τ.

The restricted diffusion coefficient for the oil is given by $$\left(\frac{D}{D_o}\right)_O = 1 - \beta_O \left(\frac{1}{S_O^{1/3}}\right)\frac{A}{V} \quad (11A)$$

where $$\beta_O = \frac{4}{9\sqrt{\pi}} \sqrt{D_{oO}(2\tau)} \quad (11B)$$

where $D/D_O$ for oil (Equation 11A) shows a different saturation dependence than does water (Equation 10A) because oil diffusion is restricted by a single "reflecting" surface (the oil-water interface) whereas water diffusion is restricted by two surfaces, the oil-water interface and the pore wall.

The above system of equations provide a forward model for T2 and D in each fluid. Oil and water both relax with their own $T2_R$ relaxation times that depend, in different ways, on pore size and saturation. Hence, the signal measured for the fluid mixture in the pore will in general exhibit bi-exponential decay, i.e., $$\text{echo}(t) = S_W \exp\left(\frac{-t}{T2_{RW}}\right) + (1-S_W)\exp\left(\frac{-t}{T2_{RO}}\right) \quad (12)$$

In accordance with the present invention, Equation 12 along with Equations 6–11 A,B can be used to simulate spin echo decays for oil-water mixtures in a water-wet pore as a function of saturation, pore size, and oil viscosity (which controls its $T_2$ and D) and for any desired pair of echo-spacings.

Specifically, for a select water saturation $S_W$ simulated relaxation rates $T2_{Ri}^{-1}$ for both the oil and the water components can be computed using Equation 6. These relaxation rates can be determined from Equations 7, 8 and 9 by substituting the values for the effective diffusion coefficients $D_i$ from Equations 10A,B and 11A,B. Substituting next the computed relaxation rates $T2_{Ri}$ in Equation 12 one can obtain a simulated NMR decay signal which reflects both the physical properties of the oil and water components in the formation and the ratio of these components.

In accordance with the present invention, the simulated decay signal is next processed following the measurement methods outlined above to compute an apparent intrinsic relaxation $T_2$ and diffusion D of the water-oil mixture. The computation can be repeated for a range of parameters which should preferably correspond to the range for the actual parameters of the fluids in a geologic formation of interest. The results of the process can be conveniently illustrated as a cross plot of T2 vs. D in which constant value parameters are shown as lines in the two-dimensional T2 - D space.

As clear from Equations 7–11A,B, in order to compute the required relaxation rates $T2_{Ri}$ it is necessary to substitute parameters of the NMR tool, including the magnetic field gradient G and the inter-echo spacings TE. In addition, it is necessary to either measure, or obtain estimates for the values for the fluid parameters $D_{oi}$, $T2_{i, bulk}$ and the surface relaxivity $\rho_2$. In a preferred embodiment, a spherical pore model is assumed for simplicity so that only the radius R of the pore remains as a separate parameter. The method of NMR log interpretation is more fully illustrated by reference to FIG. 10 which is a block diagram showing the sequence of processing steps in accordance with a preferred embodiment of the present invention.

Figure 10:
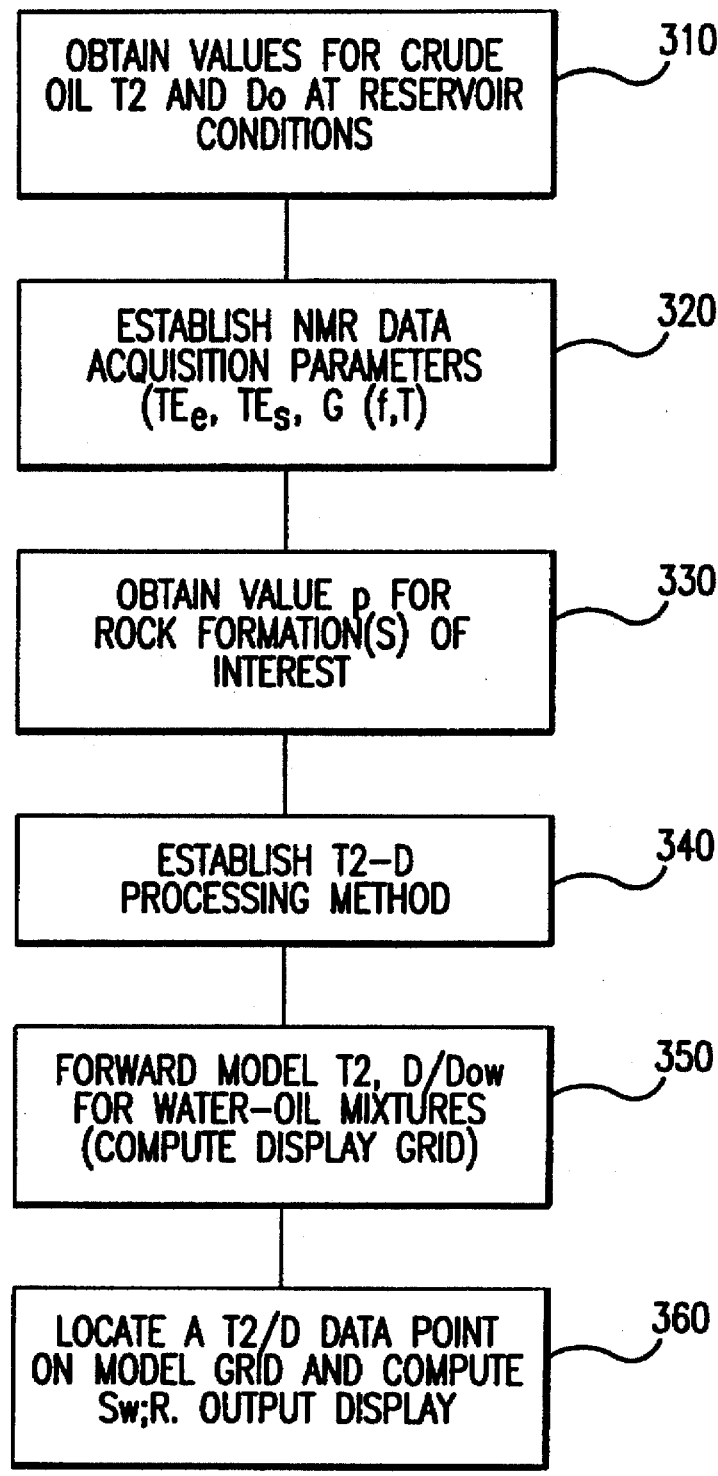
FIG. 10 is a block diagram showing the sequence of processing steps in accordance with a preferred embodiment of the method of the present invention.
Figure 11A:
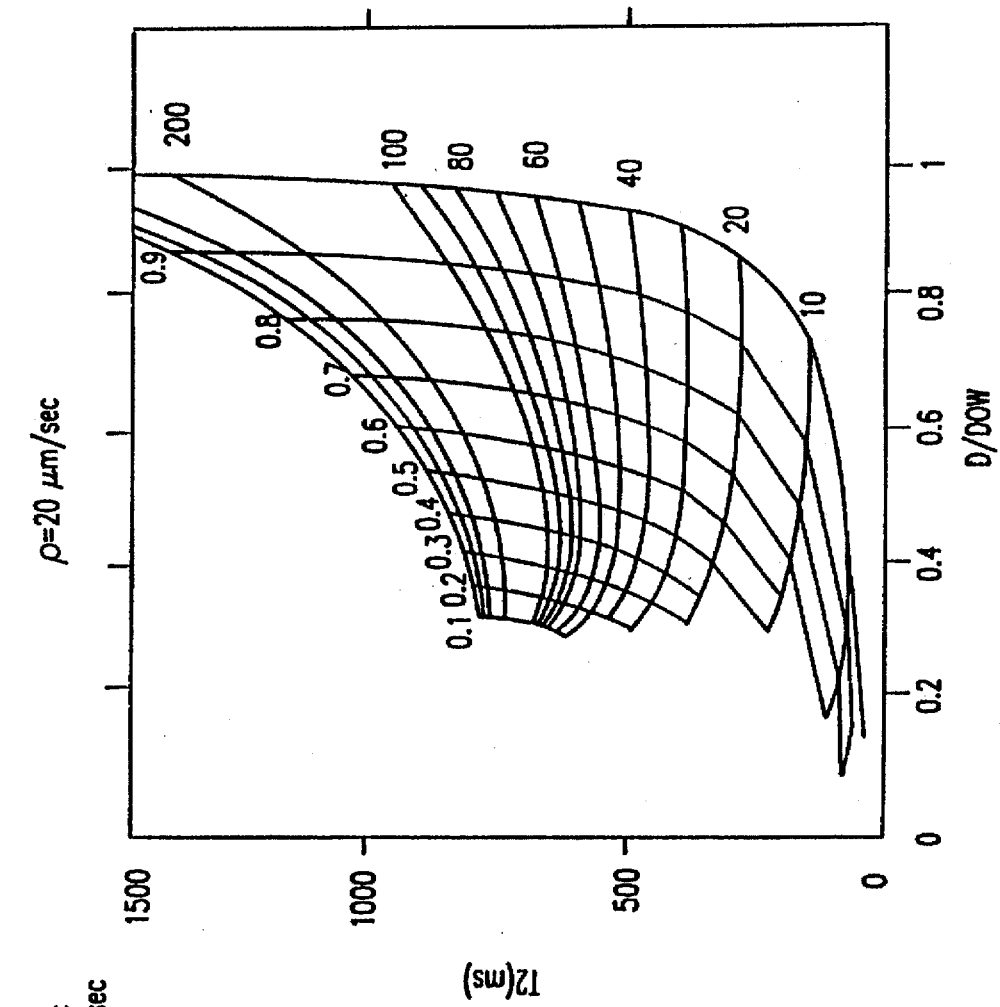
FIG. 11 illustrates a series of T2 - D/Dow cross-plots obtained in accordance with the method of the present invention by varying model parameters of the oil and water mixture.
Figure 11B:
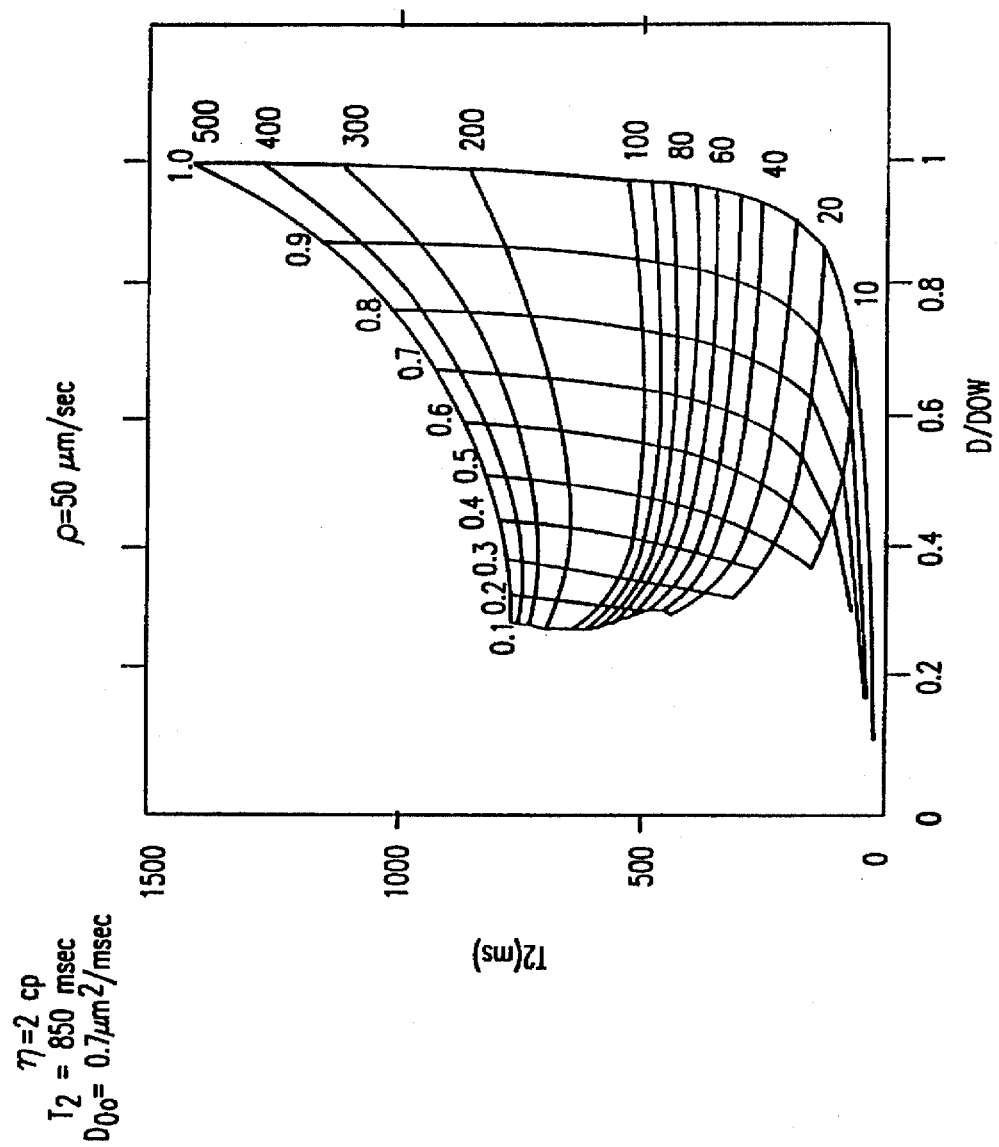
Figure 11C:
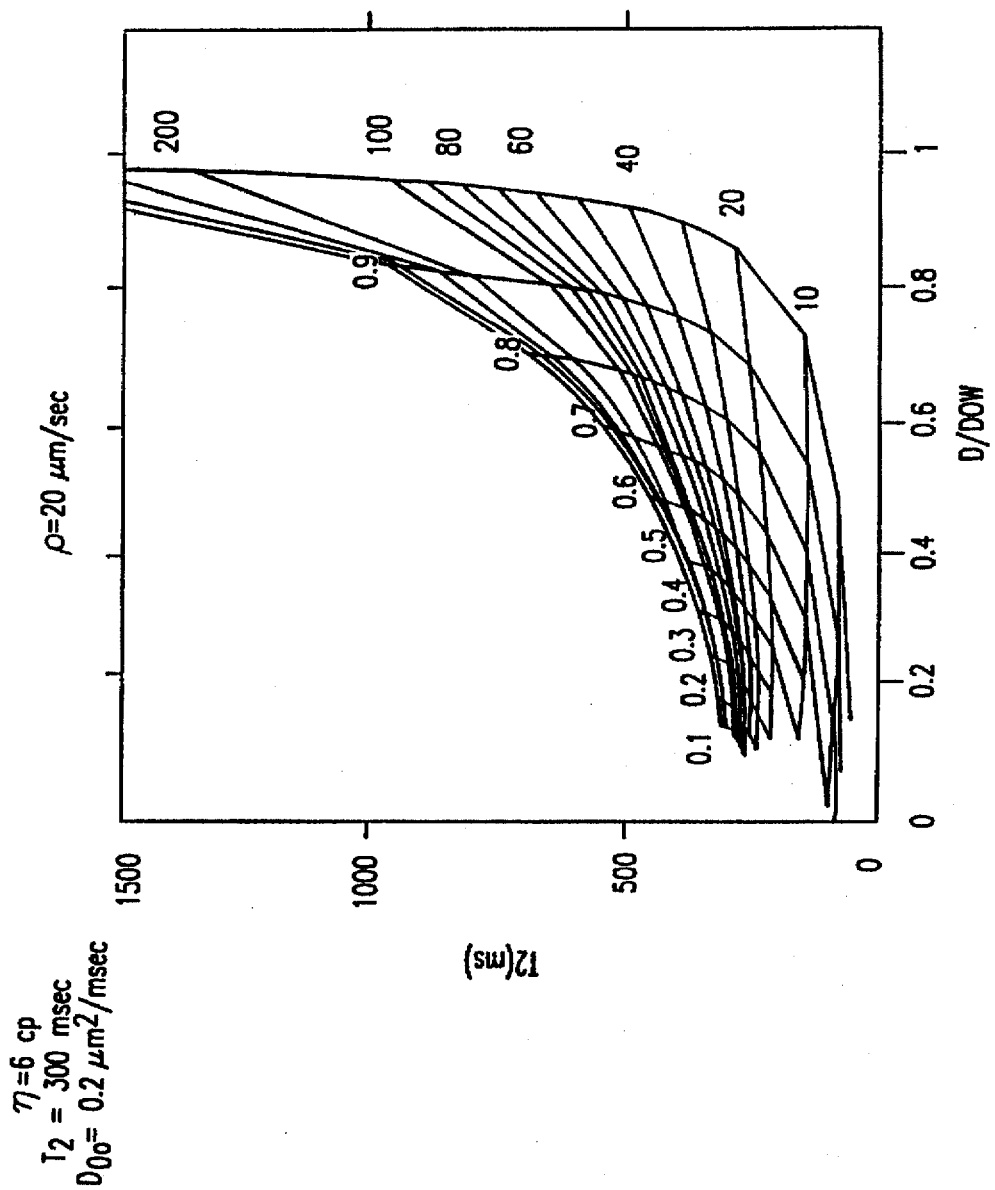
Figure 11D:
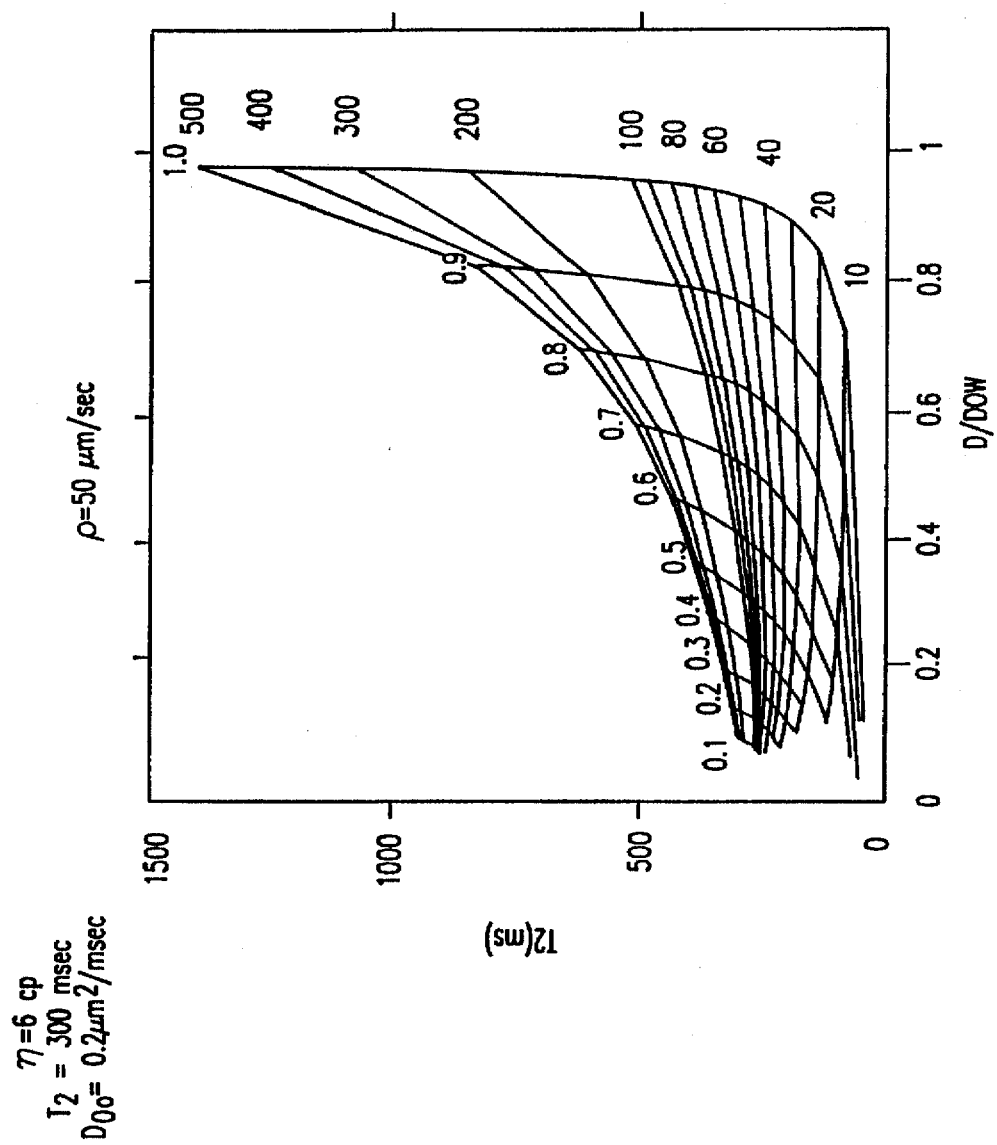
Figure 11E:
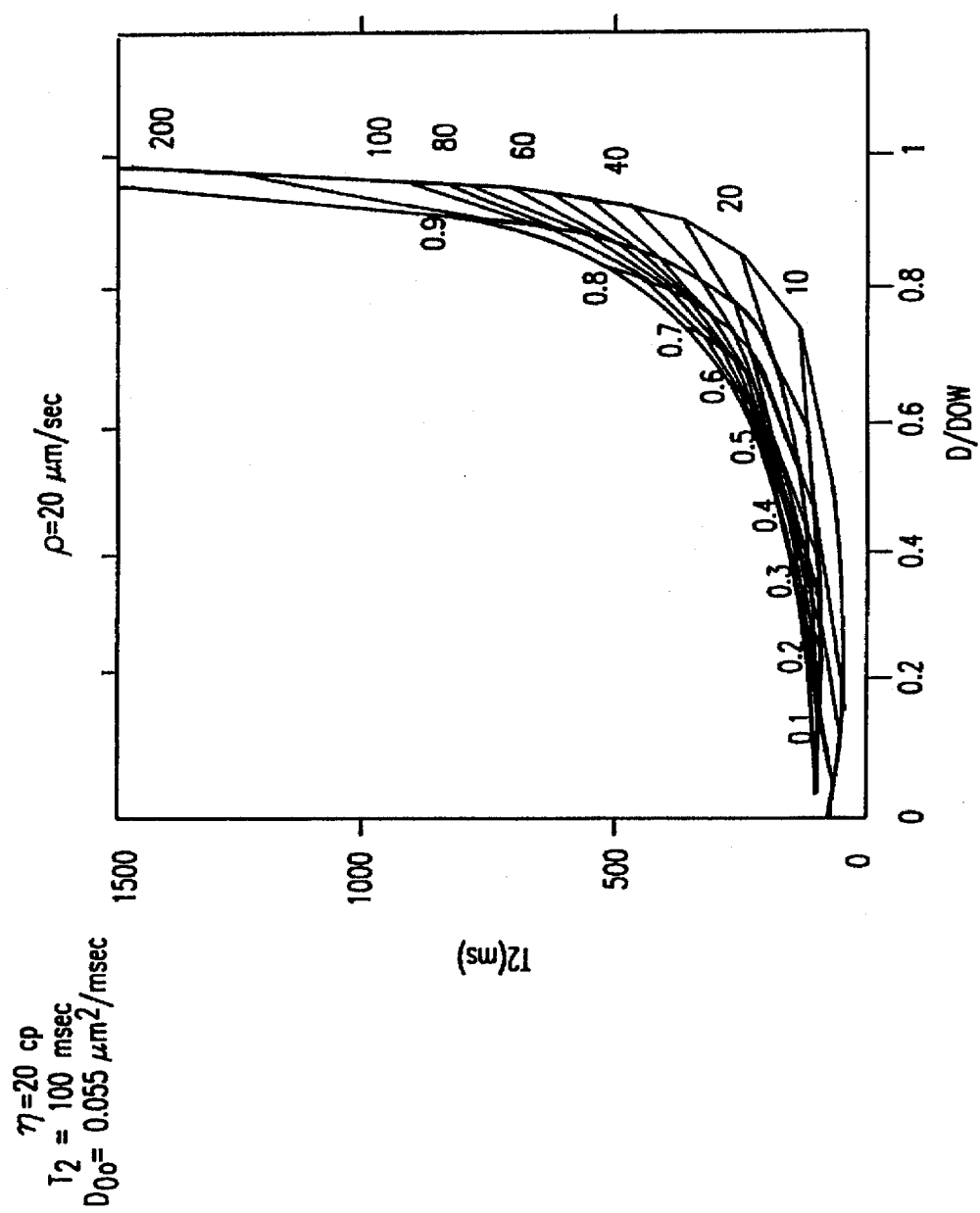
Figure 11F:
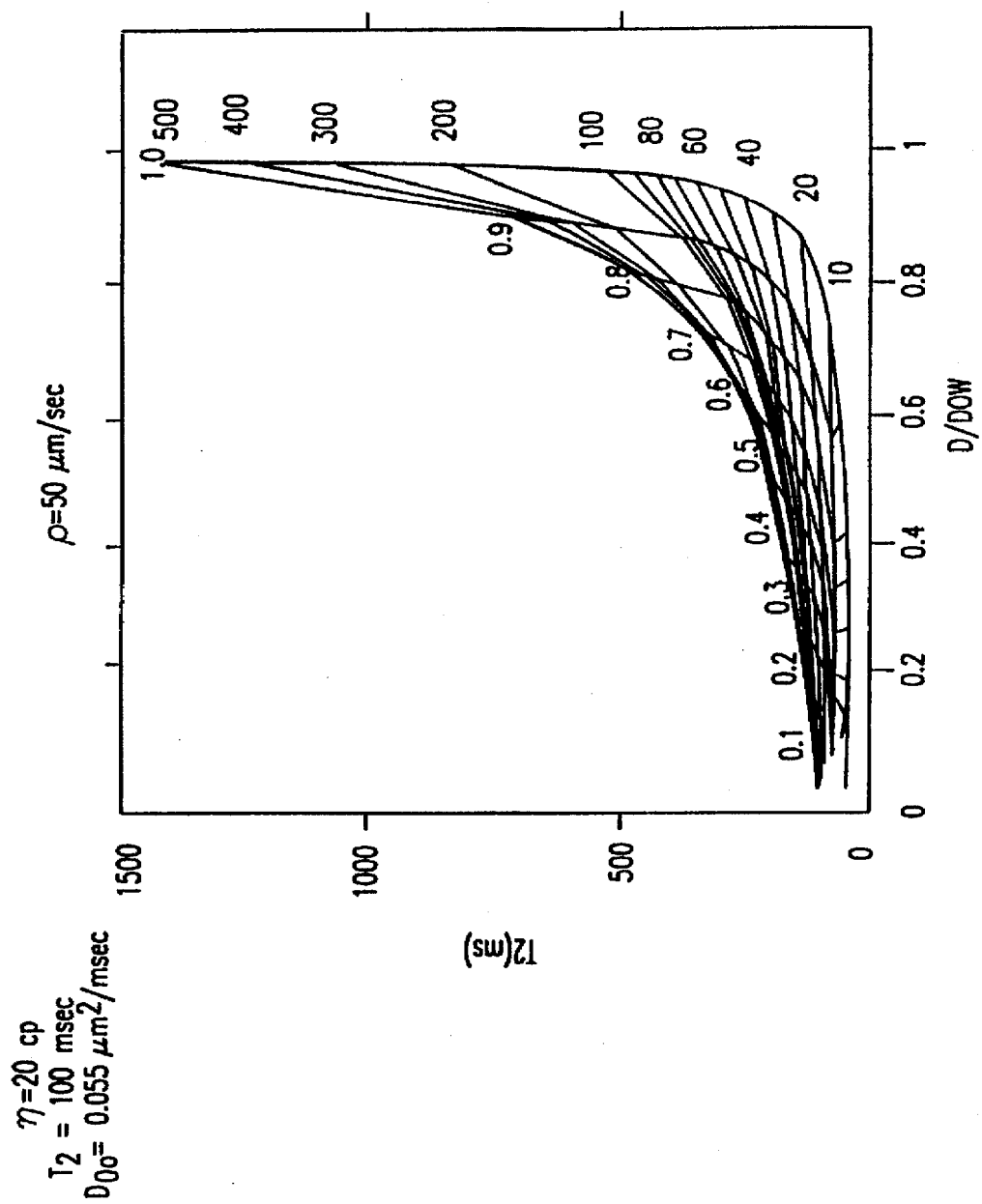

As shown in FIG. 10, in a preferred embodiment the method of the present invention is initiated at step 310 by obtaining values for the crude oil T2 and $D_O$ parameters at reservoir conditions. Such values may be obtained using laboratory NMR measurement of oil samples, or alternatively by estimating such parameter values from measured oil viscosity or oil gravity.

In step 320, NMR data acquisition parameters are established, including values for the inter-echo spacing pair $TE_{1,s}$, and the magnetic gradient G=f(f,T) as a function of the operating frequency f and measurement temperature T.

In step 330, the surface relaxivity of the rock formation is estimated by laboratory NMR measurements on core sample (s), NMR log data from a water zone, or by some standardized values for matrix lithology as known in the field. It should be noted that steps 310, 320 and 330 can be interchanged or combined in practical measurements.

Step 340 of the method establishes the T2 - D processing method which step consists of obtaining a mean value of a full $T2_R$ distribution for each spacing TE. Such mean value can also be computed using a partial, free-fluid, $T2_R$ distribution; and obtaining T2 and D distributions from the $T2_R$ distributions.

In step 350, forward model T2 and D/Do of oil-water mixtures are computed for different ranges of values for $S_W$. Preferably, the results are presented in a two-dimensional T2 - D grid plot which may be displayed on display 58 in FIG. 3. Finally, in step 360, an actual NMR measurement from the well bore is compared to the precomputed values in the T2 - D grid and used to obtain simultaneously estimate of the actual water saturation $S_W$ of the formation at the measurement point, and an estimate of the pore radius R. As indicated in FIG. 10, intermediate results and measurement data can be displayed close to real time on display 58 shown in FIG. 3. Furthermore, in accordance with a preferred embodiment of the present invention the user can compare the measured data, as it is being computed to different simulation models which can be predetermined for various ranges of the expected parameters and stored prior to the NMR measurements in data storage 56.

The following section on log interpretation and the following illustrative examples provide more detail as to the practical use of the described method in accordance with the present invention.

The T2 - D Log Interpretation Model

The mathematical model for diffusion and relaxation of an oil-water mixture contained in a single, water-wet pore along with the parameter measurement techniques developed above leads directly to a novel practical log interpretation device, which is a cross plot of T2 vs. D for oil-water mixtures as a function of pore size, saturation, and oil viscosity. The normalized diffusion coefficient D/Dow, where Dow is the bulk diffusivity of water (at formation temperature), is plotted instead of D to normalize data for the effects of temperature. A series of such cross plots is shown in FIGS. 11. Contours of constant saturation and pore radius form a curvilinear grid on the cross plots; the constant $S_W$ contours are the steeper set of curves. Thus, locating a data point on such a cross plot provides a means for determining pore size and near-wellbore fluid saturation from NMR log data alone.

The location and shape of the contours on the T2 vs. D cross plot shown in FIG. 11 depend on both rock and fluid properties and on the measurement parameters $TE_1$, $TE_S$ and G. The two most important control parameters are the surface relaxivity ρ and the viscosity of the oil v, which in turn controls the T2 and bulk diffusivity Do parameters of the oil. FIG. 11 shows the effects of varying these parameters within nominal ranges on the contour pattern. Relaxivity controls the position of the Sw=1 line on the grid; larger values of ρ pull this contour down and to the right. Viscosity controls the vertical position and separation of the constant pore size contours. For light to medium weight oils, T2 depends mainly on pore size whereas D depends mainly on $S_W$. As oil viscosity increases, T2 and D both decrease which has the effect of compressing the grid at the low $S_W$ end and, hence, reducing sensitivity of the cross plot to variations in pore size. Note that diffusion remains a viable saturation indicator even for heavier oils. The method of the present invention is more fully illustrated in the following examples.

Example 1

Figure 12A:
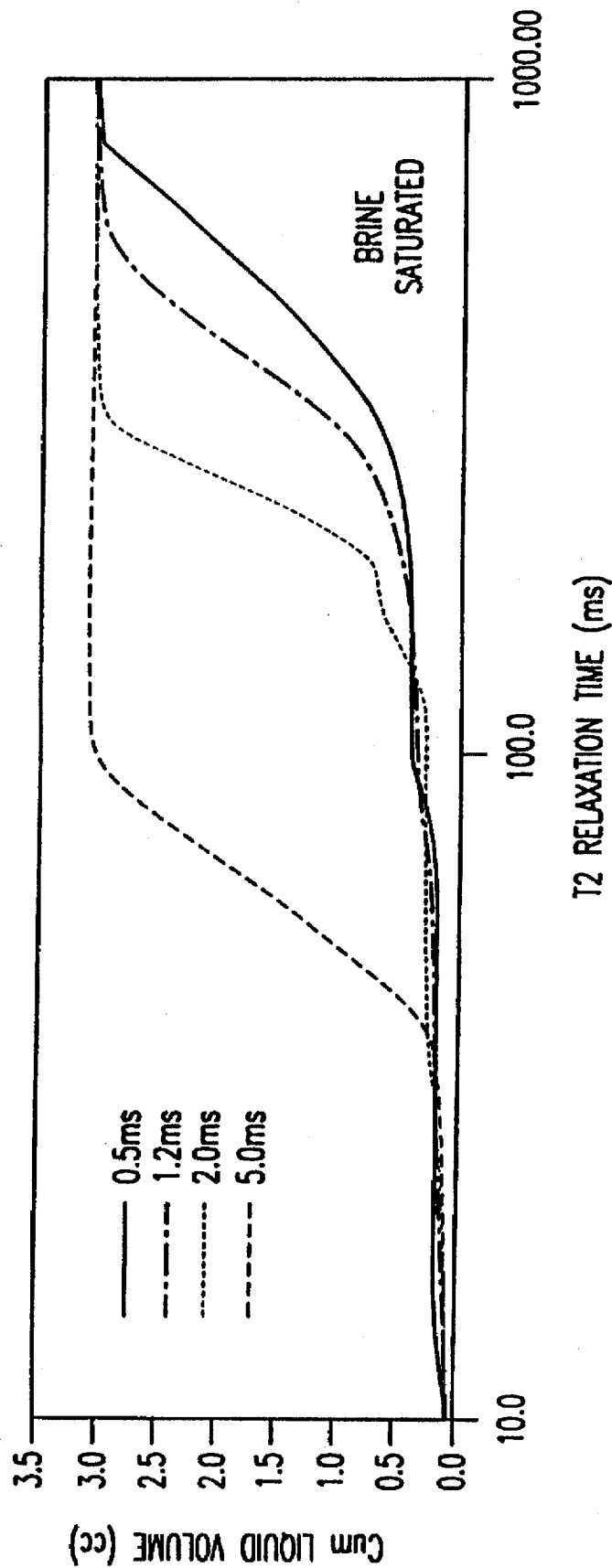
FIGS. 12 A–C show cumulative T2 distributions measured at Sw=1; and Sw=Swi for two different viscosity oils.
Figure 12B:
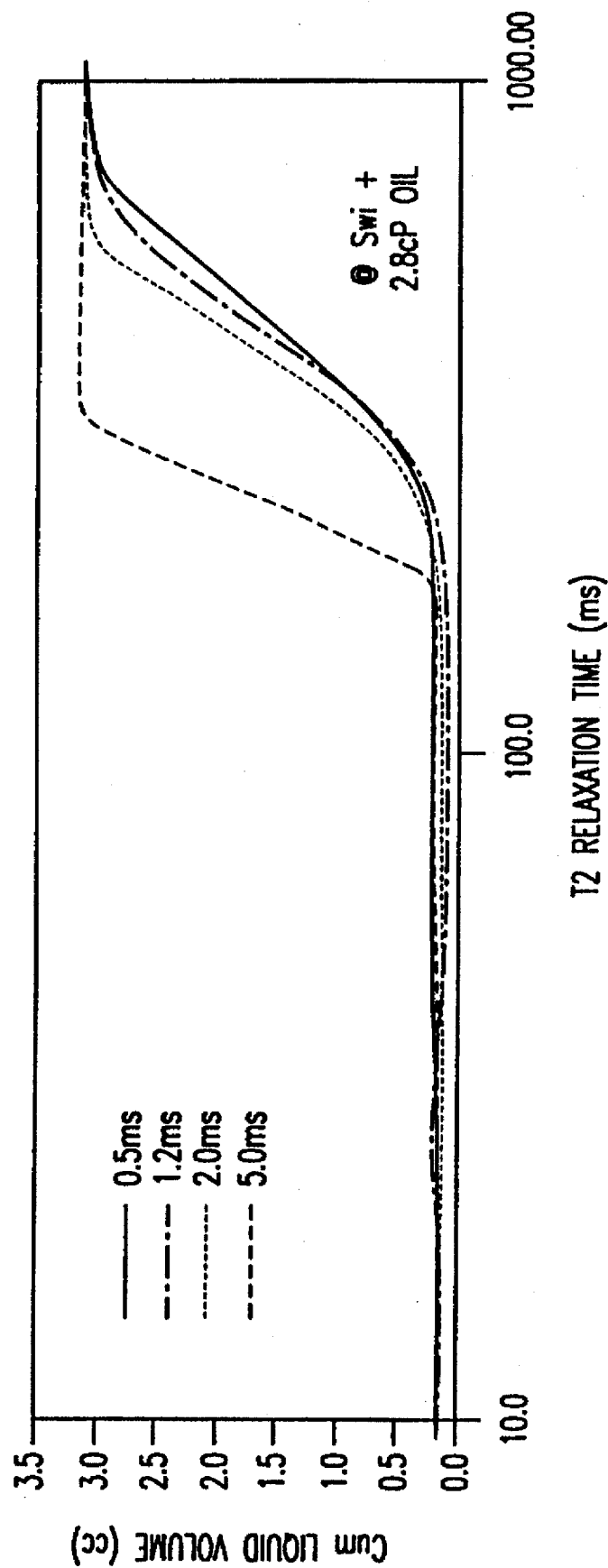
Figure 12C:
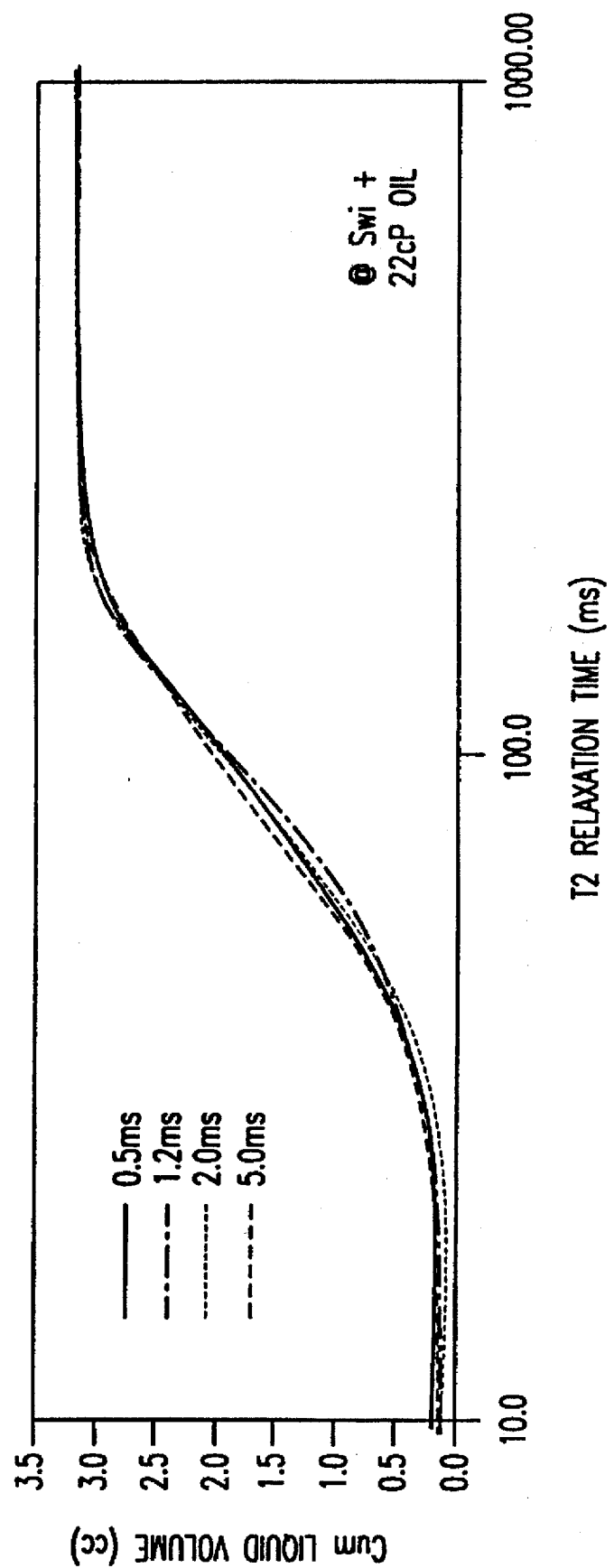

As an indication of the validity of the model developed above, laboratory NMR measurements of oil and water in three matched plug samples of Bentheim sandstone (resat. porosity=23.0 pu, Klinkenberg perm=2240 md) were performed using a commercially available NMR core analyzer operating at G=17 Gauss/cm and 32° C. Measurements at 4 inter-echo spacings, from 0.5 to 5 msec, were made at two saturation levels: 1) Sw=1 and 2) at Sw=Swi=5% (determined gravimetrically). The two irreducible-state samples were prepared by first centrifuging an initially water-saturated plug to 150 psi air-brine capillary pressure followed by oil-flooding. FIG. 12A shows cumulative T2 distributions measured at Sw=1; results at Sw=Swi for two different viscosity oils are shown in FIGS. 12B and 12C. The properties of these oils are shown in the following Table.

| Oil properties at 32° C. | | | |
|---|---|---|---|
| ID | Vis. [cP] | T2 [msec] | D [cm$^2$/sec] |
| S3 | 2.8 | 551. | $3.65 \times 10^{-6}$ |
| S20 | 22. | 107. | $5.06 \times 10^{-7}$ |

The viscosities listed were obtained from the supplier (Cannon Instruments., Inc. State College, Pa.) while the T2 and D values shown are obtained from NMR measurements.

The diffusion-induced shift to shorter $T2_R$ relaxation times as TE increases is most pronounced for the water-saturated sample (FIG. 12A). The irreducible state sample with the lighter S3 oil (FIG. 12B) shows a smaller, but clearly observable shift, especially at the two longer TE values (2 and 5 msec). In contrast, the sample with the heavier S20 oil (FIG. 12C) shows a very small shift. The range of echo spacings used in these tests are comparable to those used in the borehole measurement. Hence, the results shown in FIGS. 12A–C indicate that, for oil viscosities greater than 10 to 20 cP, molecular diffusion in the oil is too slow to measure with the logging tool. Any diffusion effect measured for oil-water mixtures in rocks containing such heavier oils must therefore be due to diffusion in the water phase only.

Intrinsic T2 and D values for the three samples shown in FIGS. 12A–C were obtained by combining the measurements made at all four echo-spacings. The method of solution used was essentially the same as the one outlined above except that a least-squares solution is used to solve the over-determined system of four Carr-Purcell equations (one for each TE) for the two unknowns (T2 and D).

Figure 13A:
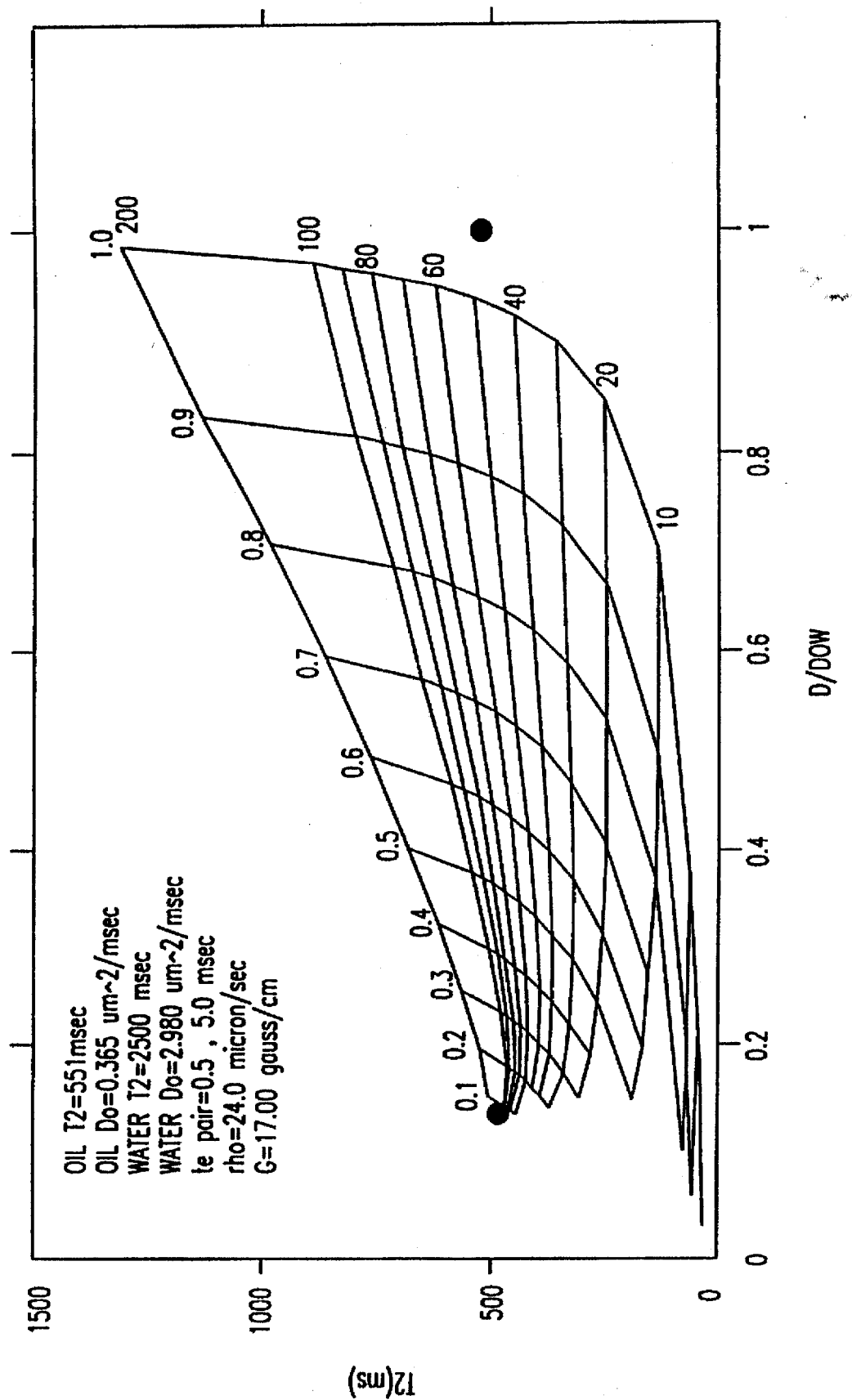
FIGS. 13 A, B show T2 and D measurements for the samples in FIGS. 12 on T2 - D/Dow cross-plots which are computed for a lighter and heavier oil respectively.
Figure 13B:
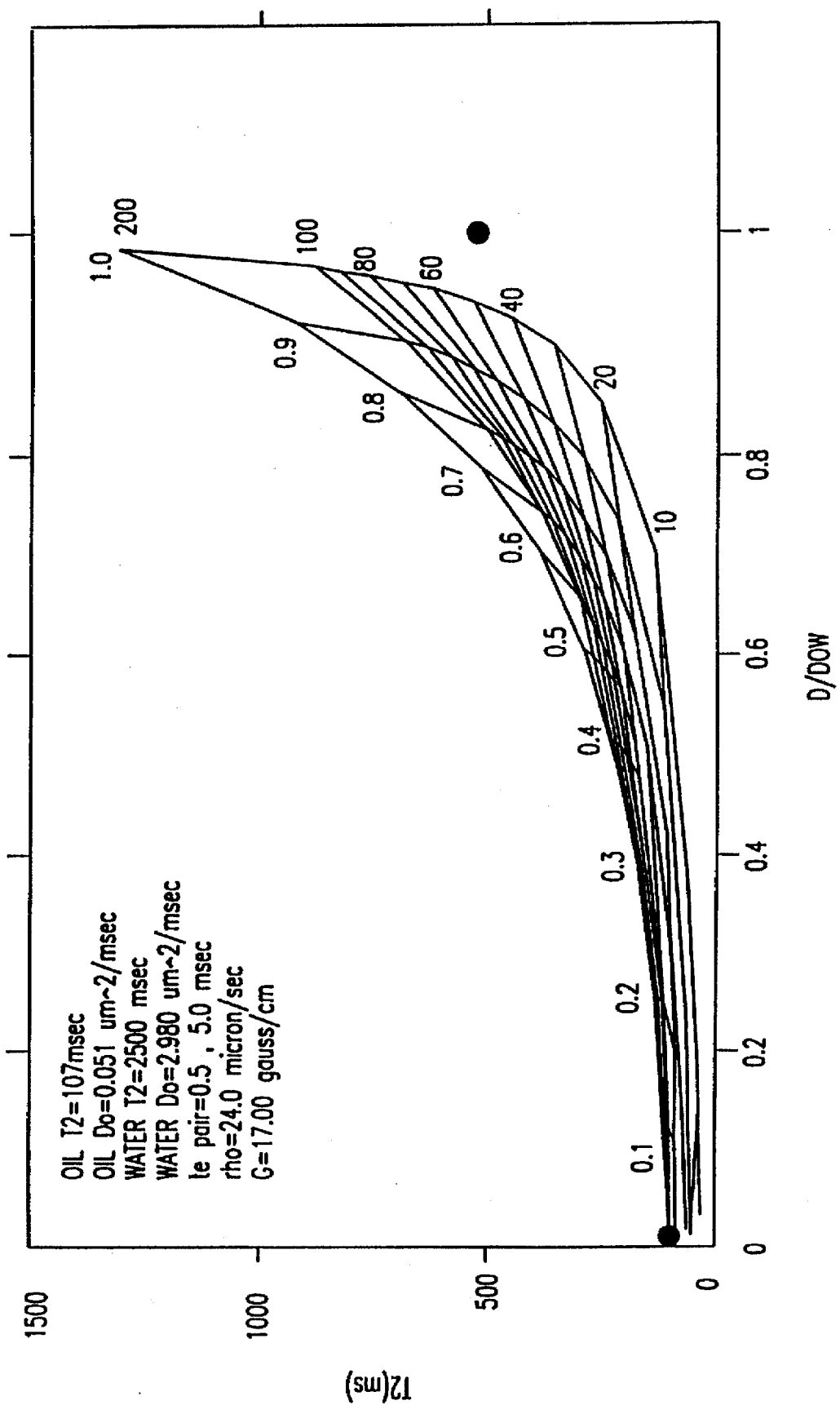

The T2 and D results for all three Bentheim samples are plotted as points in FIGS. 13 A, B. The irreducible-state sample with the lighter S3 oil is shown in FIG. 13A while FIG. 13B shows the data for the heavier oil; the Sw=1 point is shown on both plots. The grids shown were computed using the measured oil properties shown in the above table. The relaxivity value used (24 μm/sec) was determined by matching the T2 distribution for a water-saturated Bentheim sample measured at G=0, TE=0.5 msec to a pore volume distribution curve obtained from high-pressure mercury injection.

The data points for oil and water mixtures in Bentheim sandstone shown in FIGS. 13A and 13B are consistent with the known saturation levels in plugs. The Sw=1 data point plots near the correct contour and the Swi point yields the correct Sw=5%. The Sw=1 point actually lies slightly outside the corresponding contour. This could be a sign that the relaxivity used to compute the grid is too low. Another possibility is that the laboratory data are correct and that the model is underestimating the D of water in the rock which the data shows to be identical to Dow, i.e., diffusion is completely unrestricted. Given the short TE's used in these experiments and the large pore size of Bentheim sandstone, the early time approximation for D (Equation 4) is clearly valid so the reason why the model might underestimate D is unclear.

The pore size estimates from T2 and D for the irreducible-state sample with S3 oil (FIG. 13A) also make physical sense. The pore radius value from the Sw=1 point is about 50 μm which seems reasonable for Bentheim sandstone. Mercury injection data show a single, sharp peak at a pore throat radius of 18 μm. Hence, NMR and mercury injection together indicate a pore body-to-throat size ratio of ~3 which again seems reasonable.

Example 2: Log Data

FIG. 14 illustrates an application of the method of the present invention to the analysis of diffusion log data. The example shown is from a shallow well in a sandstone reservoir in Western Canada. The diffusion log data was acquired with a 2,4 msec TE pair using an earlier generation tool operating near 940 kHz and G=24 Gauss/cm. The logged interval is characterized by a long transition zone (915 to 925 m) separating a thin oil zone at irreducible conditions (910 to 915 m) from an underlying water zone (FIG. 14B). Consistent with the impression from the conventional wireline log suite (tracks 1, 2, 3, FIG. 14B), reservoir quality generally degrades upward from the clean, high-permeability (>1 darcy) sands comprising the water zone to laminated/shaly sands in the oil zone. The log-derived relaxation times used to compute T2 and D in this example (track 4, FIG. 14B) are the slow-decay component ($T2_R$) values from constrained bi-exponential fits to echo magnitudes.

The cross plot (FIG. 14A) was computed using values of T2 and D for bulk oil measured on an oil sample from the reservoir. The crude is a low GOR oil with a 27–29 API gravity and a hydrogen index (determined by NMR) of 0.94. CPMG measurements made at G=0, TE=0.5 msec reveal a broad relaxation time distribution, with $T2_R$ components ranging from a few to a few hundred msec, presumably reflecting a broad range of molecular weight hydrocarbons that make up the crude. The bottom hole temperature in this well was 28° C. which is close to the lab measurement temperature (32° C.). Therefore the measured oil T2 and D values were used directly, i.e., no temperature correction was applied to the oil properties prior to computing the cross plot (FIG. 14A).

Figure 14A:
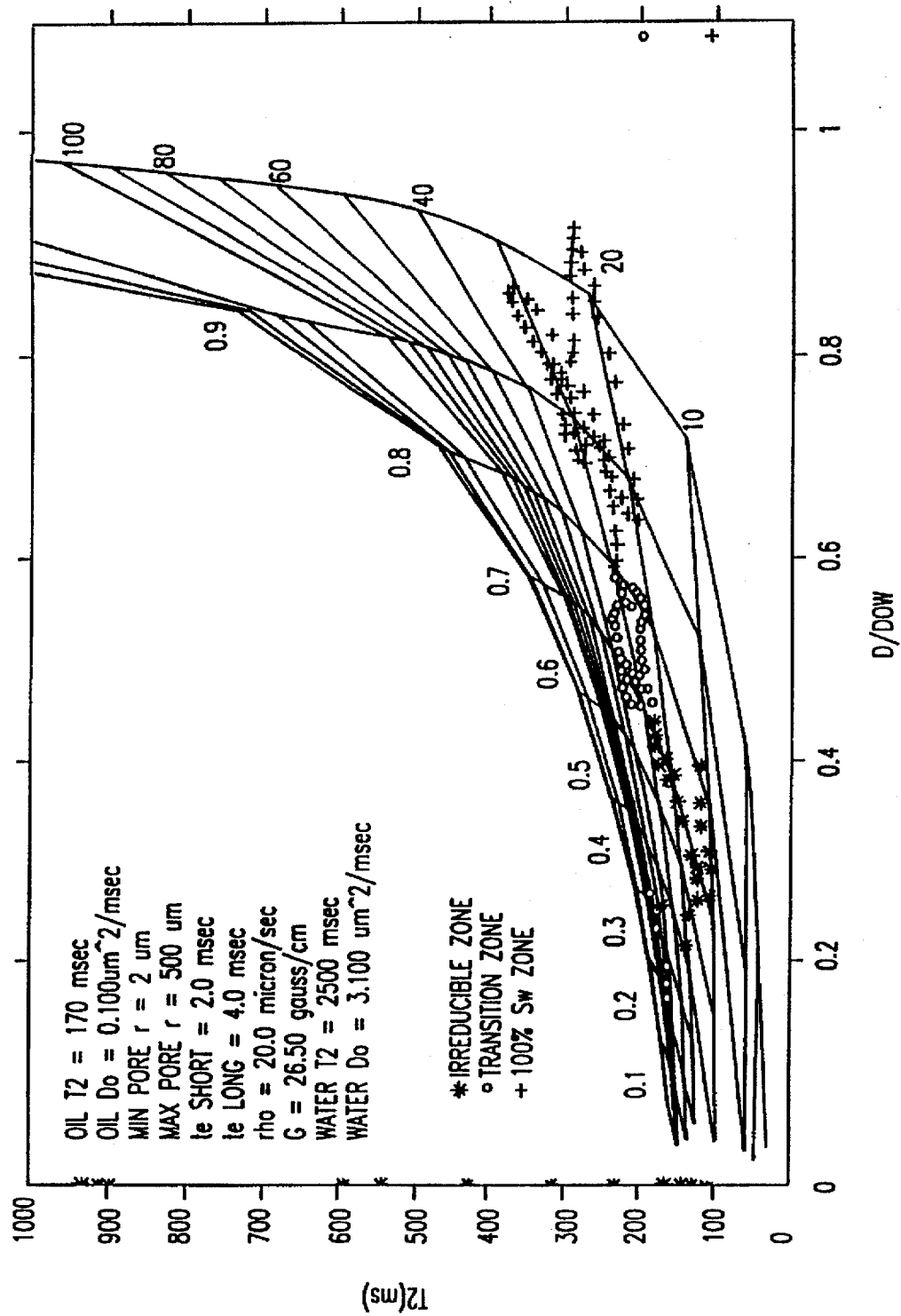
FIGS. 14 A–G illustrates a potential application of the model to the analysis of diffusion log data. The log example shown is from a shallow well in a sandstone reservoir in Western Canada.
Figures 14B, 14C, 14D:
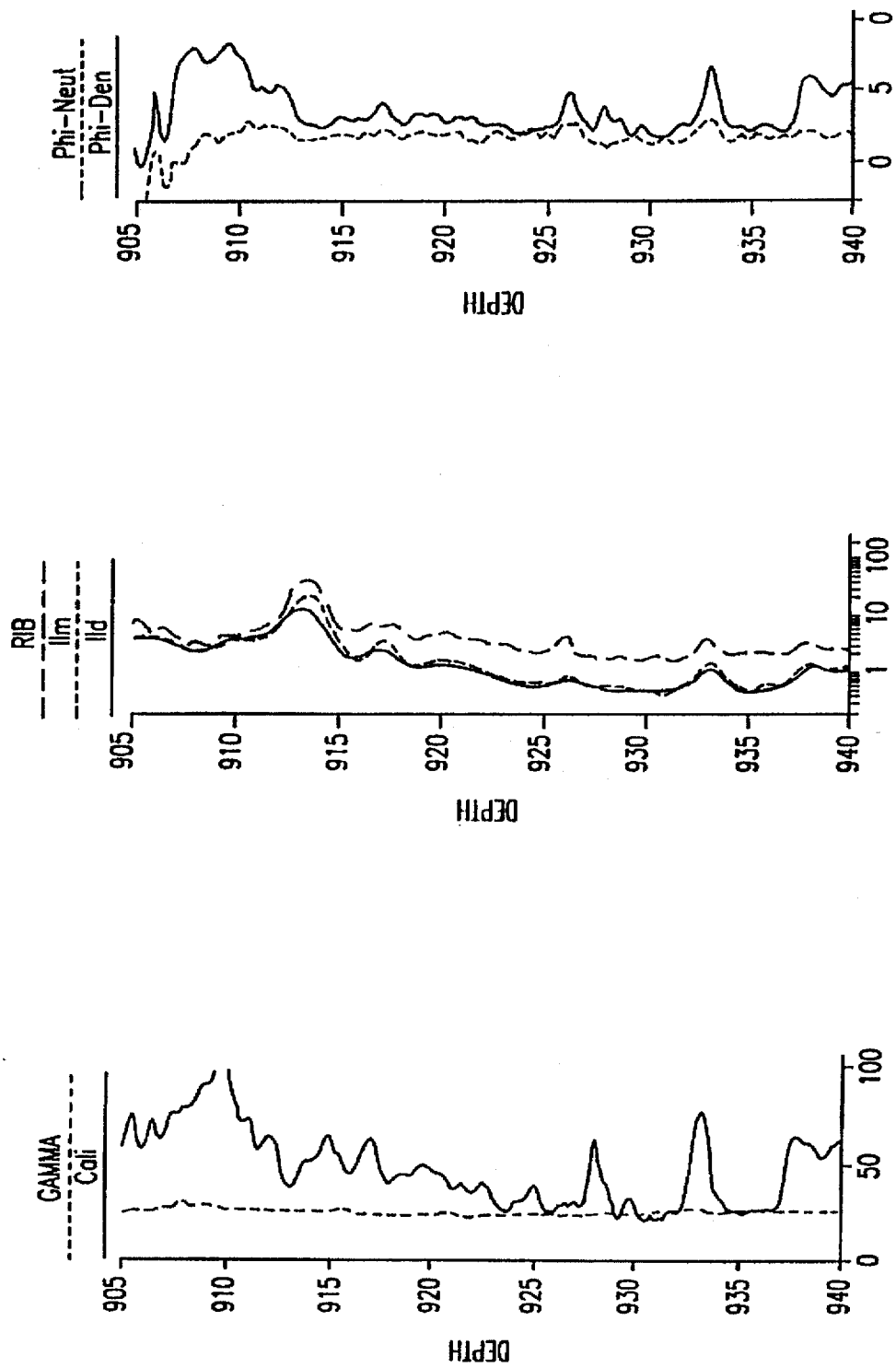
Figure 14G:
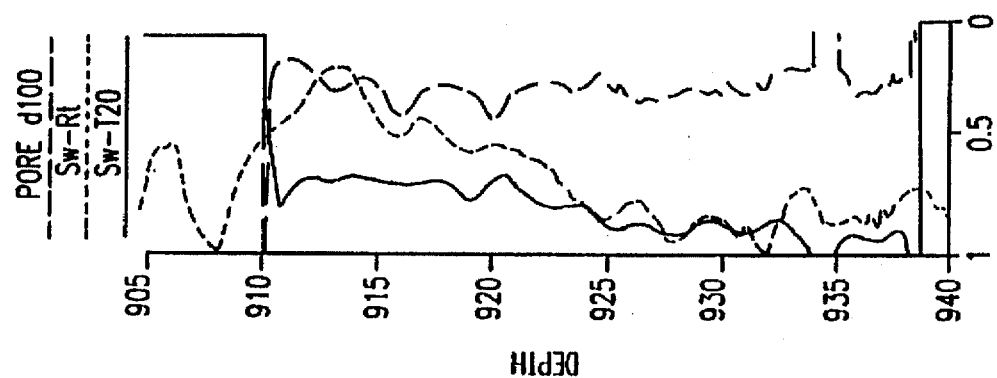
Figure 14F:
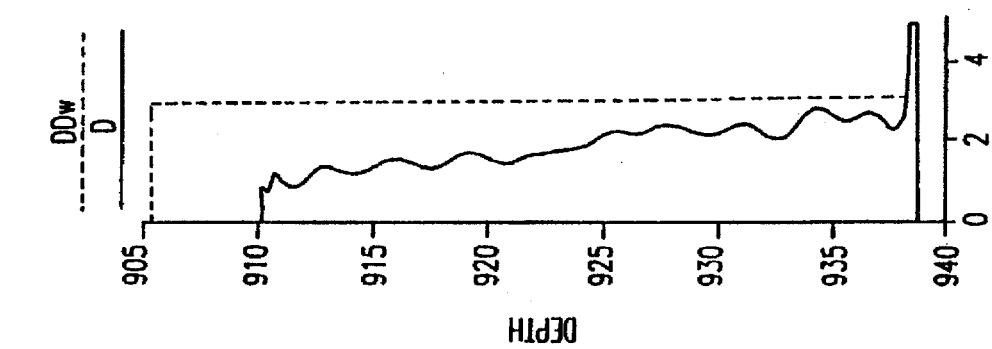
Figure 14E:
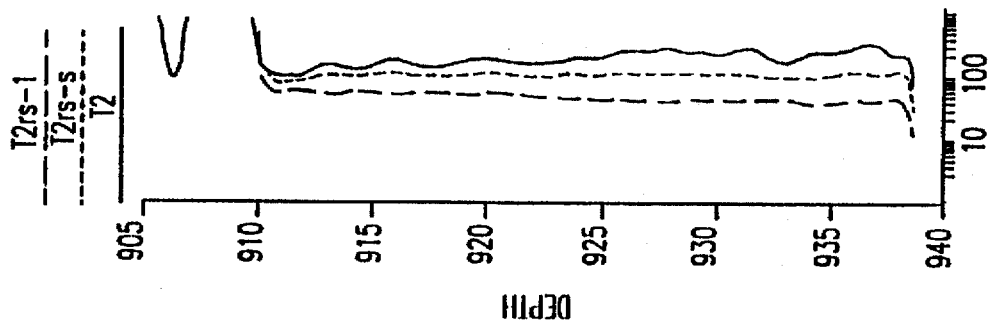

Results for T2 and D are shown in cross plot form in FIG. 14A and as logging curves in FIG. 14B (tracks 4 and 5). On the cross plot, different symbols are used to distinguish points from the water zone (+), the transition zone (o), and the oil zone (*). This coding makes visible the orderly progression of points along a diagonal trend across the grid. Consistent with the model behavior, points move down and to the left as depth and Sw decrease.

Also shown are saturation and pore radius curves (track 6, FIG. 14B) computed by interpolation of points on the grid (FIG. 14A). For scale compatibility, the units of pore radius shown are microns/100 (i.e., multiply the curve value by 100 to get pore radius in µm). Consistent with the known reservoir geology, the computed pore size shows a steady value of about 30 µm in the clean water sand interval and gradually decreases toward the 10 to 15 µm range in the oil zone.

This example also illustrates the potential pitfall of using a T2 measurement alone to estimate formation pore size. For example, the apparent pore size from T2 alone (=3ρ×T2 for spherical pores) in the transition zone (T2≈200 msec) is about 10 µm whereas the true pore size is ~30 µm. Notice this error arises even at relatively low oil saturations.

The NMR-derived water saturation (Sw-T2D in track 6, FIG. 14B) is essentially constant at ~75% in the transition and oil zones whereas Sw from conventional porosity and deep resistivity (Sw-Rt) decreases steadily upward toward values near 20% in the oil zone. The separation between the two curves thus gives an indication of the volume of oil moved by mud filtrate invasion into the sensitive volume of NMR logging tool.

Comments

To more fully appreciate the scope of the present invention several observations are in order. For example, it can be recognized that the fast diffusion property of gas makes it at present difficult to measure parameters related to the presence of gas in the formation. Accordingly, the method described above has been discussed primarily in the context of water-oil mixtures. It can be appreciated, however, that the proposed model can be extended in a straightforward manner to include a component related to the presence of gas, which would enable detection of gas using the same T2 - D method.

It can further be appreciated that assuming knowledge of any one of the three formation parameters: pore size R, water saturation $S_W$ and oil viscosity, one can construct a model in which the T2 - D measurement combination can simultaneously provide an estimate of the remaining two parameters. Thus, while the discussion above focused on determination of the R and $S_W$ parameters, assuming knowledge of the viscosity, the method can easily be extended to the remaining two estimation pairs.

The method of the present invention generally reflects the FFI pore space. Accordingly, comparison to other log based saturation estimates must take into account the involved volumetrics. Thus, for example the total water in the MRIL measurement space is the FFI water plus the total bound water volume. Further detail in this respect can be found in patent application Ser. No. 08/261,542 to one of the present inventors.

Figure 15:
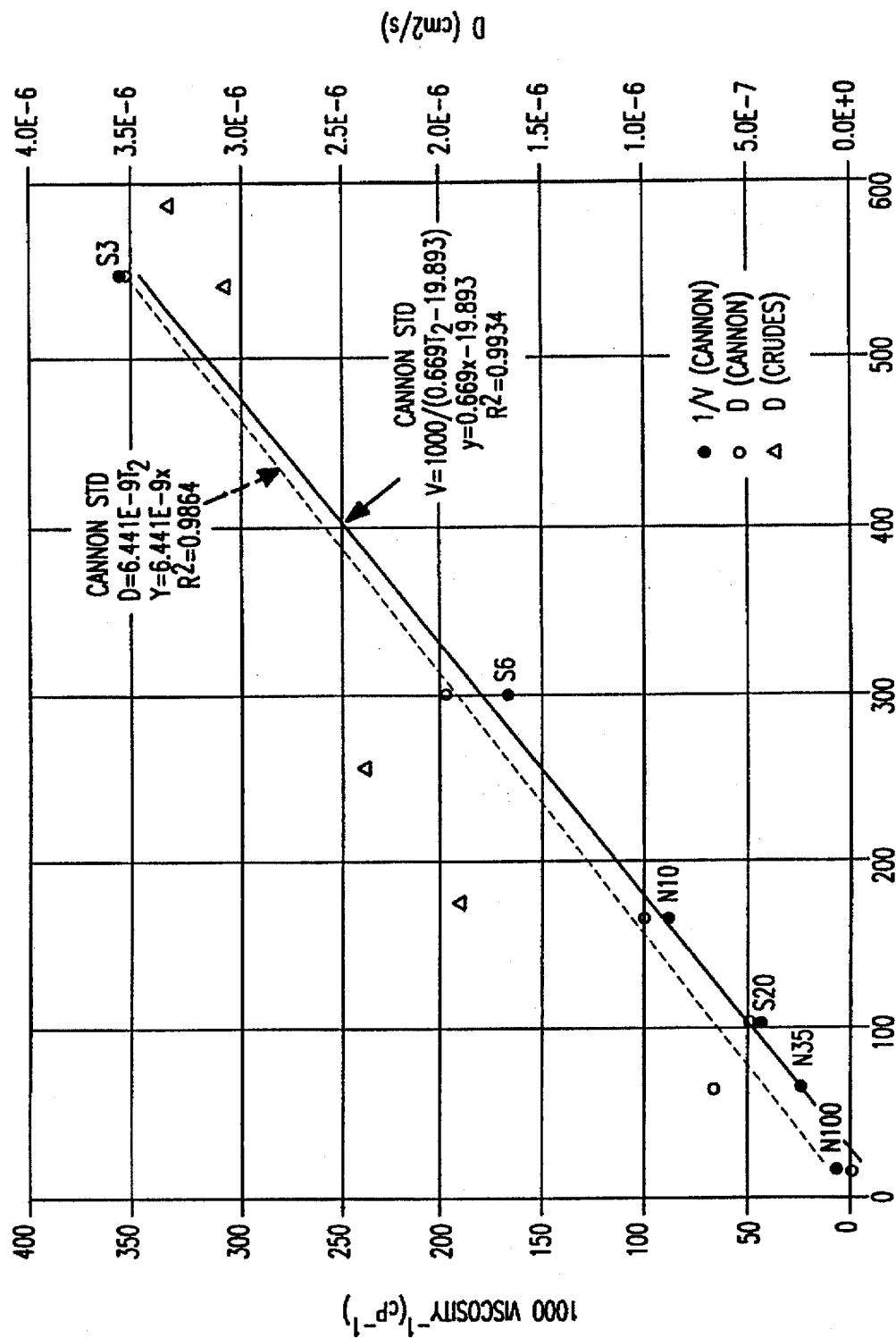
FIG. 15 illustrates the correlation between T2 and oil viscosity which can be used to estimate viscosity from T2 - D measurements in accordance with the method of the present invention.

The method of the present invention can additionally be extended to compute estimates of the fluid viscosity which is a key parameter in the Darcy flow equation. Historically, this parameter has only been obtained through direct measuring of fluid samples. The T2 - D interpretation method described above can be used to determine viscosity using the following approach. A T2 value representative of the oil group in a formation can first be determined. The determined T2 value can next be calibrated against the viscosity of oil samples measured in a laboratory. Comparison of further NMR measurement parameters T2 against the calibrated viscosity can provide a direct indication of the viscosity of the measurement sample. More specifically, if the water saturation $S_W$ is relatively low, it can be assumed that the intrinsic T2 parameter of the water oil mixture is approximately equal to that of the oil. The oil viscosity can then directly be estimated using the correlation between T2 and oil viscosity. An example of this correlation is shown in FIG. 15.

It is known in the art that laboratory data shows good correlation between the ratio of the T2 parameter in water filled samples to the formation resistivity factor F and the formation intrinsic permeability. Prior art studies generally failed to account for the influence of hydrocarbons on the T2 measurement parameter. Since the relaxation rate T2 and the D/Do ratio are both pore size dependent, even as the fluid mix changes, the respective data for a given pore size (related to the formation permeability) tends to form in the T2 - D/Dow crossplot developed in accordance with the present invention a linear locus of points between the all water ($S_W=1$) and the irreducible saturation $S_{Wirr}$ points as a function of the changing fraction of the two fluid components. This feature was considered above in connection with the constant pore radius lines of the T2 - D crossplots and is illustrated for example in FIG. 13. Therefore, it is believed that the T2 - D crossplots of the present invention can be used to estimate indirectly other formation parameters of interest, including its permeability.

The preferred embodiment of the system and method of the present invention discussed above are mainly concerned with determination of the saturation and pore size parameters of a geologic formation of interest. It is well known in the art that these parameters can be used to obtain additional information about the formation, such as its porosity, permeability, producibility and others. Methods of obtaining such additional information have been discussed in the prior art and are not be considered in further detail. It is clear, however, that the method of the present invention can be applied directly to the estimation of such additional parameters.

Although the present invention has been described in connection with a preferred embodiment, it is not intended to be limited to the specific form set forth herein, but rather should cover such modifications, alternatives, and equivalents as can be reasonably included within the spirit and scope of the invention, as defined by the following claims.

What is claimed is:

1. A method for determining the composition of a geologic structure using a gradient NMR logging tool, comprising the steps of:

imparting a polarizing gradient magnetic field to a geologic structure for a predetermined period of time;

exciting nuclei of a population of particles in the geologic structure with an RF field;

measuring NMR signals representing spin-echo relaxation of the population of particles in the geologic structure;

determining values for a transversal relaxation time T2 of the geologic structure from said measured signals;

determining values for a restricted diffusion coefficient D of the geologic structure from said measured signals; and deriving additional petrophysical properties of the geologic structure from said T2 values and from said D values and displaying the derived properties in a human-readable form, said petrophysical properties comprising: water and hydrocarbon saturation levels; permeability; pore size and pore size distribution; oil viscosity; formation resistivity factor F; porosity; and producibility, wherein the step of deriving comprises the step of modeling the measured NMR signals as a superposition of signals corresponding to a water fraction and signals corresponding to an oil fraction weighted by a water saturation parameter $S_W$ of the formation.

2. The method according to claim 1 wherein the polarizing magnetic field gradient is fixed.

3. The method according to claim 1 wherein the polarizing magnetic field gradient is pulsed.

4. The method of claim 1 further comprising the step of modeling the measured NMR signals according to the expression:

$$X(t) = S_W \exp\left(\frac{-t}{T2_{RW}}\right) + (1 - S_W)\exp\left(\frac{-t}{T2_{RO}}\right)$$

in which X is the amplitude of the measured NMR signal; $S_W$ is the water saturation;

$T2_{RW}$ is apparent relaxation time for the water fraction of the geologic structure; and $T2_{RO}$ is apparent relaxation time for the oil fraction of the geologic structure.

5. The method of claim 4 wherein the apparent relaxation time for each fraction of the geologic structure is provided by the expression:

$$T2_{Ri}^{-1} = T2_i^{-1} + T2_{Di}^{-1}$$

in which i=W for water; and i=O for oil; $T2_i$ is the intrinsic relaxation rate of the corresponding fraction of the geologic structure; and $T2_{Di}$ is the diffusion-induced relaxation rate of the corresponding fraction of the geologic structure.

6. The method of claim 5 wherein the intrinsic relaxation rates can be computed using the expressions:

$$T2_O^{-1} = T2_{bulk\ oil}^{-1}$$

$$T2_W^{-1} = T2_{bulk\ water}^{-1} + \rho_2 \left(\frac{A}{VS_W}\right)$$

in which A and V are respectively the pore surface area and volume, and $\rho_2$ is the surface relaxivity.

7. The method of claim 6 wherein the diffusion-induced relaxation rates can be computed using the expressions:

$$T2_{Di}^{-1} = \frac{D_i}{3} (\gamma G \tau)^2$$

where $D_i$ is the effective diffusion coefficient for the respective fluid; $\gamma$ is the gyromagnetic ratio; G is the magnetic field gradient, and $\tau$ is pulse-echo time delay.

8. The method of claim 7 wherein the diffusion coefficients for the water and oil fractions are given by the expressions:

$$\left(\frac{D}{D_o}\right)_W = 1 - \beta_W \left(\frac{1 + S_O^{2/3}}{S_W}\right) \frac{A}{V}$$

for oil, where $S_O = 1 - S_W$ is the oil saturation and $$\beta_W = \frac{4}{9\sqrt{\pi}} \sqrt{D_{oW}(2\tau)}$$

and for water:

$$\left(\frac{D}{D_o}\right)_O = 1 - \beta_O \left(\frac{1}{S_O^{1/3}}\right) \frac{A}{V}$$

where $$\beta_O = \frac{4}{9\sqrt{\pi}} \sqrt{D_{oO}(2\tau)} \ .$$

9. The method of claim 4 wherein said additional petrophysical properties of the geological structure are derived on the basis of the model obtained in the step of modeling the measured NMR signals.

10. The method according to claim 9 wherein an additional petrophysical property of the geologic structure is the water saturation $S_W$ of the geologic structure.

11. The method according to claim 9 wherein an additional petrophysical property of the geologic structure is the apparent pore radius R of the pores of the geologic structure.

12. A system for determining the composition of a geologic structure using a gradient NMR logging tool, comprising:

means for imparting a polarizing gradient magnetic field to a geologic structure for a predetermined period of time;

means for exciting nuclei of a population of particles in the geologic structure with an RF field;

means for measuring NMR signals representing spin-echo relaxation of the population of particles in the geologic structure;

means for determining values for a transversal relaxation time T2 of the geologic structure from said measured signals;

means for determining values for a restricted diffusion coefficient D of the geologic structure from said measured signals; and means for deriving additional petrophysical properties of the geologic structure from said T2 values and from said D values and displaying the derived properties in a human-readable form, said petrophysical properties comprising: water and hydrocarbon saturation levels; permeability; pore size and pore size distribution; oil viscosity; formation resistivity factor F; porosity; and producibility, wherein said means for deriving comprises means for modeling the measured NMR signals as a superposition of signals corresponding to a water fraction and signals corresponding to an oil fraction weighted by a water saturation parameter $S_W$ of the formation.

13. The system according to claim 12 further comprising:
means for modeling the measured NMR signals according to the expression:

$$X(t) = S_W \exp\left(\frac{-t}{T2_{RW}}\right) + (1 - S_W)\exp\left(\frac{-t}{T2_{RO}}\right)$$

in which X is the amplitude of the measured NMR signal;
$S_W$ is the water saturation;
$T2_{RW}$ is apparent relaxation time for the water fraction of the geologic structure; and
$T2_{RO}$ is apparent relaxation time for the oil fraction of the geologic structure.

14. The system according to claim 13 wherein said means for deriving comprises means for deriving the water saturation $S_W$ of the geologic structure on the basis of the model obtained in said means for modeling the measured NMR signals.

15. The system according to claim 13 wherein said means for deriving comprises means for deriving the apparent pore radius R of the pores of the geologic structure on the basis of the model obtained in said means for modeling the measured NMR signals.

16. Apparatus for conducting NMR measurements comprising:
means for providing a magnetic field gradient at a desired location in a material located externally of the source of the magnetic field gradient;
means for carrying out at least one NMR measurement in the presence of the magnetic field gradient, said measurement producing at least a first and a second NMR echo signals;
means for sensing a diffusion effect on the decay of at least the first and the second NMR echo signals;
means for determining a diffusion coefficient D, said means for determining receiving input from said means for sensing;
means for determining a T2 relaxation time; and
means for deriving additional properties of the material from said T2 values and from said D values and displaying the derived properties in a human-readable form, said petrophysical properties comprising: water and hydrocarbon saturation levels; permeability; pore size and pore size distribution; oil viscosity; formation resistivity factor F; porosity; and producibility, wherein said means for deriving comprises means for modeling the measured NMR signals as a superposition of signals corresponding to a water fraction and signals corresponding to an oil fraction weighted by a water saturation parameter $S_W$ of the formation.

17. The apparatus according to claim 16 further comprising:

means for modeling the measured NMR signals according to the expression:

$$X(t) = S_W \exp\left(\frac{-t}{T2_{RW}}\right) + (1 - S_W)\exp\left(\frac{-t}{T2_{RO}}\right)$$

in which X is the amplitude of the measured NMR signal;
$S_W$ is the water saturation;
$T2_{RW}$ is apparent relaxation time for the water fraction of the geologic structure; and
$T2_{RO}$ is apparent relaxation time for the oil fraction of the geologic structure.

18. The apparatus according to claim 17 wherein said means for deriving comprises means for deriving the water saturation $S_W$ of the geologic structure on the basis of the model obtained in said means for modeling the measured NMR signals.

19. The apparatus according to claim 17 wherein said means for deriving comprises means for deriving the apparent pore radius R of the pores of the geologic structure on the basis of the model obtained in said means for modeling the measured NMR signals.

* * * * *